US012801487B2

(12) United States Patent
Toms et al.

(10) Patent No.: US 12,801,487 B2
(45) **Date of Patent: *Nov. 17, 2026**

(54) SOFTWARE-BASED NETWORK PROBES FOR MONITORING NETWORK DEVICES FOR FAULT MANAGEMENT

(71) Applicant: Level 3 Communications, LLC, Denver, CO (US)

(72) Inventors: Steve Toms, Middleburg, FL (US); David Sutton, Monroe, LA (US); Wayne L. Williams, Littleton, CO (US); Binu Baby, Highlands Ranch, CO (US); Nashat Saqqa, Westminster, CO (US); Amer Khan, Erie, CO (US); Pranit Ambardekar, Erie, CO (US); Ranjith Kumar Nooka, Thornton, CO (US); Mark Chase, Clive, IA (US); Keith Sebesta, Saint Paul, MN (US); Tim W. Kimpton, Fort Smith, AR (US); Shelley Goldner, Superior, CO (US); Shelli L. Hurd, Arvada, CO (US)

(73) Assignees: Level 3 Communications, LLC, Denver, CO (US); CenturyLink Intellectual Property LLC, Denver, CO (US)

( * ) Notice: Subject to any disclaimer, the term of this patent is extended or adjusted under 35 U.S.C. 154(b) by 6 days.

This patent is subject to a terminal disclaimer.

(21) Appl. No.: 19/093,731

(22) Filed: Mar. 28, 2025

(65) Prior Publication Data

US 2025/0252012 A1 Aug. 7, 2025

Related U.S. Application Data

(63) Continuation of application No. 18/358,771, filed on Jul. 25, 2023, now Pat. No. 12,265,449.

(Continued)

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0709* (2013.01); *H04L 41/0213* (2013.01); *H04L 43/04* (2013.01)

(58) Field of Classification Search
CPC ............. G06F 11/0793; G06F 11/0709; H04L 41/0213; H04L 43/04
See application file for complete search history.

(56) References Cited

U.S. PATENT DOCUMENTS 7,299,277 B1 11/2007 Moran
11,294,895 B1 4/2022 Kostakis
(Continued)

FOREIGN PATENT DOCUMENTS

EP 3131234 2/2017

*Primary Examiner* — Jason B Bryan

(57) ABSTRACT

Novel tools and techniques are provided for implementing software-based network probes for monitoring network devices for fault management. In various embodiments, a computing system may receive, from at least one software-based network probe, a first alert associated with a first device among layer 4 devices disposed in a plurality of networks; may parse and store first alert data from the received first alert in a database, in a standardized format; may perform, using an enrichment system, enrichment of the first alert data, by retrieving first enrichment data from one or more second databases and adding the first enrichment data to the parsed and formatted first alert data in the first database to form first consolidated alert data; and may send the first consolidated alert data to a fault management system for display to a user to facilitate addressing of the first alert by the user.

17 Claims, 13 Drawing Sheets

Related U.S. Application Data

(60) Provisional application No. 63/410,749, filed on Sep. 28, 2022.

(51) Int. Cl.
*H04L 41/0213* (2022.01)
*H04L 43/04* (2022.01)

(56) References Cited

U.S. PATENT DOCUMENTS

| | | | | |
|---|---|---|---|---|
| 2003/0200486 | A1 | 10/2003 | Marwaha | |
| 2005/0261878 | A1 | 11/2005 | Shrivastava | |
| 2005/0273667 | A1 | 12/2005 | Shrivastava | |
| 2007/0005738 | A1 | 1/2007 | Alexion-Tiernan | |
| 2008/0052393 | A1* | 2/2008 | McNaughton | H04L 12/5692 709/224 |
| 2010/0023604 | A1 | 1/2010 | Verma | |
| 2011/0261055 | A1 | 10/2011 | Wong | |
| 2011/0264967 | A1* | 10/2011 | Lovy | H04L 41/0233 714/49 |
| 2012/0269089 | A1 | 10/2012 | Morrill | |
| 2015/0019913 | A1* | 1/2015 | Singh | G06F 11/0709 714/37 |
| 2018/0285237 | A1* | 10/2018 | Scott | G06F 11/3604 |
| 2018/0367561 | A1 | 12/2018 | Givental | |
| 2020/0112475 | A1 | 4/2020 | Garapati | |
| 2021/0271506 | A1 | 9/2021 | Ganguly | |
| 2021/0273843 | A1 | 9/2021 | Selokar | |
| 2024/0103962 | A1 | 3/2024 | Toms | |

* cited by examiner

SOFTWARE-BASED NETWORK PROBES FOR MONITORING NETWORK DEVICES FOR FAULT MANAGEMENT

CROSS-REFERENCES TO RELATED APPLICATIONS

This application claims priority to U.S. Patent Application Ser. No. 63/410,733 (the "'733 Application"), filed Sep. 28, 2022, by Steve Toms et al., entitled, "Global Internet Protocol Management System (GIMS) for Monitoring Network Devices for Fault Management," and U.S. Patent Application Ser. No. 63/410,749 (the "'749 Application"), filed Sep. 28, 2022, by Steve Toms et al., entitled, "Software-Based Network Probes for Monitoring Network Devices for Fault Management," the disclosure of each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing network management, and, more particularly, to methods, systems, and apparatuses for implementing code-based or software-based network probes for monitoring network devices for fault management.

BACKGROUND

Conventional network management systems are unable to handle all aspects of fault management. In the context of monitoring for faults, conventional network management systems only handle aspects of monitoring (e.g., only passive monitoring, only active polling, only pinging, and/or the like) network devices, but either do not utilize a broader suite of collection modalities and/or do not normalize alerts and/or do not enrich alerts with device, network, or other information, or the like, thereby resulting in incomplete information being presented to users or technicians, which prolongs resolution of network faults, requires further information gathering by the users or technicians, prolongs impact to the network and users or customers of network services, and so on. This is particularly so for network devices at the transport layer.

Hence, there is a need for more robust and scalable solutions for implementing network management, and, more particularly, to methods, systems, and apparatuses for implementing software-based network probes for monitoring network devices for fault management.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n," where n denotes any suitable integer number, and may be either the same or different from the suffix "n" for other components in the same or different figures. For example, for component #1 105*a*-105*n*, the integer value of n in 105*n* may be the same or different from the integer value of n in 110*n* for component #2 110*a*-110*n*, and so on.

DETAILED DESCRIPTION OF CERTAIN EMBODIMENTS

Overview

Figure 1A:
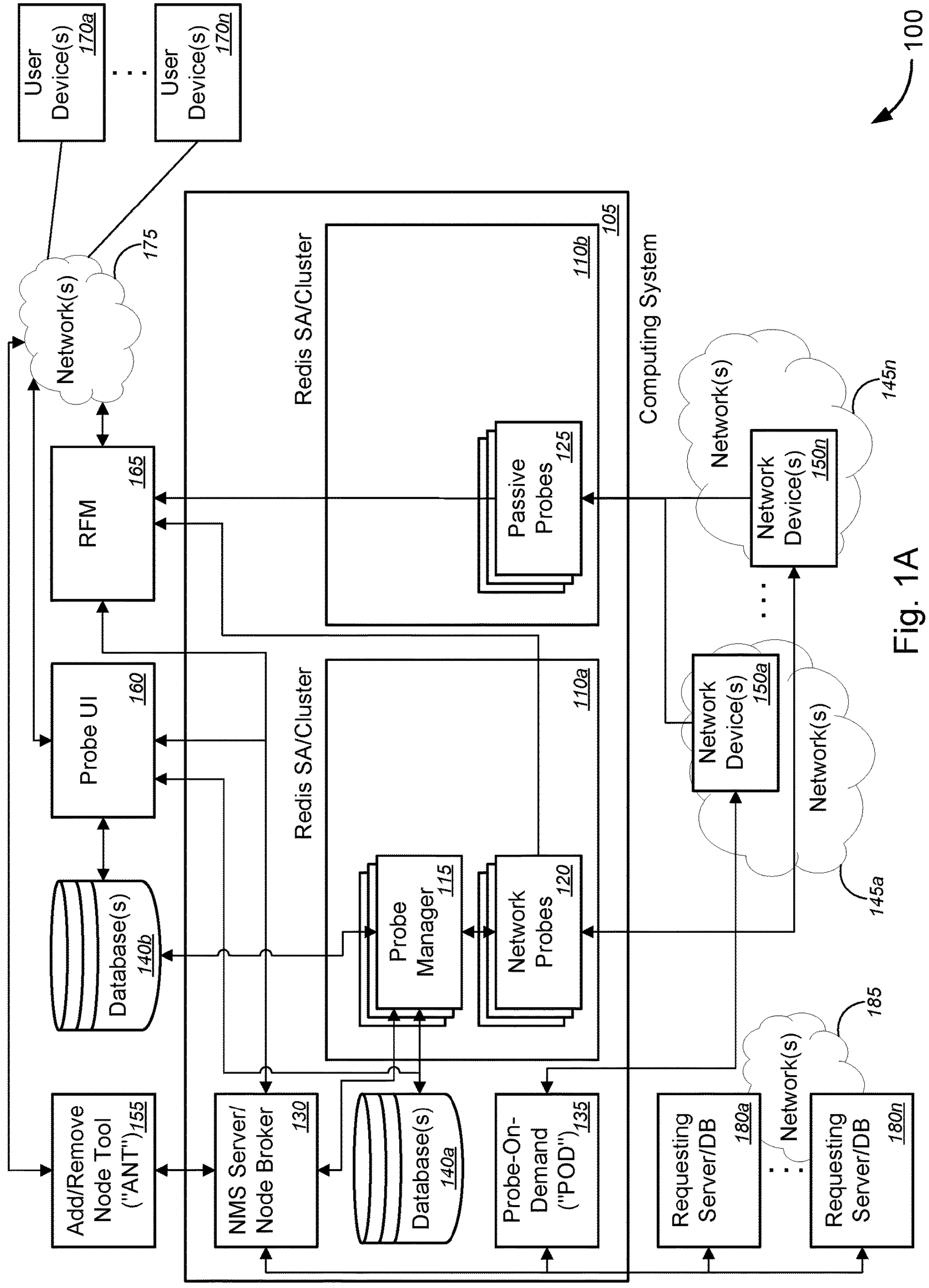
FIGS. 1A and 1B are schematic diagrams illustrating various non-limiting examples of systems for implementing software-based network probes for monitoring network devices for fault management, in accordance with various embodiments.

Various embodiments provide tools and techniques for implementing network management, and, more particularly, to methods, systems, and apparatuses for implementing software-based network probes for monitoring network devices for fault management.

In various embodiments, a computing system may receive, from at least one first software-based network probe among a first plurality of software-based network probes, a first alert associated with a first device among a plurality of layer 4 devices that is each disposed within at least one first network among a plurality of networks, the layer 4 devices corresponding to open systems interconnection ("OSI") model's transport layer, the first alert comprising first alert data; may parse the first alert data in the received first alert; may store, in a first database, the parsed first alert data in a standardized format as parsed and formatted first alert data; may perform, using an enrichment system, enrichment of the first alert data, by: retrieving first enrichment data from one or more second databases, the first enrichment data comprising at least one of first device data associated with the first device or first network data associated with a network in which the first device is disposed; and adding the first enrichment data to the parsed and formatted first alert data stored in the first database to form first consolidated alert data; and may send the first consolidated alert data to a fault management system for display to a user to facilitate addressing of the first alert by the user.

Alternatively, or additionally, the computing system may generate one or more first software-based network probes among a first plurality of software-based network probes, the first plurality of software-based network probes being configured to: monitor a plurality of layer 4 devices that is each disposed within at least one first network among a plurality of networks, the first alert comprising first alert data; and may send alert data associated with one or more first devices among the plurality of layer 4 devices in response to determining an alert situation associated with the one or more first devices has occurred.

In some embodiments, generating the one or more first software-based network probes may comprise at least one of: generating, using the computing system, one or more second software-based network probes, based on corresponding one or more templates each for a particular type and/or model of layer 4 device among the plurality of layer 4 devices; generating, using the computing system and an automated bulk probe generation and deployment system, a second plurality of software-based network probes among the first plurality of software-based network probes, based at least in part on parameters provided by a user in a probe user interface ("UI"); generating, using the computing system and an add/remove node tool ("ANT"), one or more third software-based network probes one at a time, based at least in part on user input via a UI of the ANT; or generating, using the computing system, one or more fourth software-based network probes, by building a configuration file for each software-based network probe, storing each configuration file in a probe database, and starting probe processes for each fourth software-based network probe based on the corresponding configuration file; and/or the like.

According to the various embodiments, the computing system provides functionalities or features of receiving and normalizing (and, in some cases, enriching) alerts for and/or from network devices (particularly, layer 4 devices corresponding to OSI model's transport layer, or the like; which may utilize different types of alerts, different alert formats, different alert modalities, and/or the like) that are disposed in one or more disparate networks utilizing different alert management protocols and different fault management protocols, and to send the alert data to a fault management system (e.g., RFM, or the like) for display to a user to facilitate addressing of the alert by the user (e.g., technicians who add or remove network devices and/or people who need access to such network devices, as listed or identified by NOC managers, or the like). The result is a robust monitoring system that collects, normalizes, enriches, and displays relevant information about alerts related to network device faults, thereby greatly facilitating the user in addressing the alerts, which shortens time for resolution of network faults, obviates further information gathering by the users or technicians, reduces impact to the network and users or customers of network services, and so on. In this manner, the functioning and/or operation of the affected network devices and the network as a whole may be improved, at least in terms of improving the field of network management, by at least normalizing and enriching alerts from disparate network devices (utilizing different types of alerts, different alert formats, different alert modalities, and/or the like) disposed in disparate networks (utilizing different alert management protocols and different fault management protocols), and/or the like.

These and other aspects of code-based or software-based network probes for monitoring network devices for fault management are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a method may comprise: receiving, using a computing system and from at least one first software-based network probe among a first plurality of software-based network probes, a first alert associated with a first device among a plurality of layer 4 devices that is each disposed within at least one first network among a plurality of networks, the layer 4 devices corresponding to open systems interconnection ("OSI") model's transport layer, the first alert comprising first alert data. The method may also comprise parsing, using the computing system, the first alert data in the received first alert; storing, using the computing system and in a first database, the parsed first alert data in a standardized format as parsed and formatted first alert data; performing, using the computing system and an enrichment system, enrichment of the first alert data, by: retrieving first enrichment data from one or more second databases, the first enrichment data comprising at least one of first device data associated with the first device or first network data associated with a network in which the first device is disposed; and adding the first enrichment data to the parsed and formatted first alert data stored in the first database to form first consolidated alert data. The method may further comprise sending, using the computing system, the first consolidated alert data to a fault management system for display to a user to facilitate addressing of the first alert by the user.

In some embodiments, the computing system may comprise at least one of a network management system server, a node broker system, a probe manager, the fault management system, a network operations center ("NOC") computing system, a server over a network, a cloud computing system, or a distributed computing system, and/or the like. In some cases, the plurality of networks may comprise two or more disparate networks utilizing different alert management protocols and different fault management protocols. In some instances, the first database may comprise at least one of a remote dictionary server ("Redis") database, a non-relational ("NoSQL") database, or a relational ("SQL") database, and/or the like. In some cases, the first consolidated alert data may comprise real-time or near-real-time consolidated alert data, and the fault management system may comprise a real-time fault management system ("RFM") that displays the real-time or near-real-time consolidated alert data.

In some instances, the plurality of layer 4 devices may comprise at least one of a layer 4 switch, a gateway device, a network node, a gateway node, a firewall, an optical network switch and routing platform, a wavelength division multiplexing ("WDM")-based optical transport network system, or a network transmission system, and/or the like. In some cases, the first plurality of software-based network probes may comprise at least one of one or more translation language protocol ("TL1")-based software-based network probes, one or more passive software-based network probes configured to passively receive alert data, one or more active software-based network probes configured to actively poll and/or ping layer 4 devices for alert data, or one or more combination software-based network probes that combine capabilities of the passive and active software-based network probes, and/or the like.

According to some embodiments, the method may further comprise generating, using the computing system, one or more second software-based network probes among the first plurality of software-based network probes. In some cases, the one or more second software-based network probes comprise the at least one first software-based network probe. Alternatively, or additionally, generating the one or more second software-based network probes may comprise at least one of: generating, using the computing system, one or more third software-based network probes, based on corresponding one or more templates each for a particular type and/or model of layer 4 device among the plurality of layer 4 devices; generating, using the computing system and an automated bulk probe generation and deployment system, a second plurality of software-based network probes among the first plurality of software-based network probes, based at least in part on parameters provided by a user in a probe user interface ("UI"); generating, using the computing system and an add/remove node tool ("ANT"), one or more fourth software-based network probes one at a time, based at least in part on user input via a UI of the ANT; or generating, using the computing system, one or more fifth software-based network probes, by building a configuration file for each software-based network probe, storing each configuration file in a probe database, and starting probe processes for each fifth software-based network probe based on the corresponding configuration file; and/or the like.

In some embodiments, the method may further comprise one or more of: monitoring, using at least one of the computing system or a probe manager, the first plurality of software-based network probes; in response to a determination that a sixth software-based network probe among the first plurality of software-based network probes is unresponsive, sending, using at least one of the computing system or the probe manager, a command to the sixth software-based network probe to restart; or in response to a new network device being added to a second network among the plurality of networks, selecting, using at least one of the computing system or the probe manager, a seventh software-based network probe among the first plurality of software-based network probes to monitor the new network device, and sending, using the at least one of the computing system or the probe manager, commands to the selected seventh software-based network probe to monitor the new network device; and/or the like.

According to some embodiments, the method may further comprise normalizing, using the computing system, the first consolidated alert data relative to a plurality of consolidated alert data that is stored in the first database.

In some embodiments, the method may further comprise: receiving, using the computing system and from one or more servers in the plurality of networks, a request for data associated with a second device among the plurality of layer 4 devices; querying, using the computing system, the first database to determine whether the first database contains data including at least one of alert data, device data, or network data that are associated with the second device; based on a determination that the first database does not contain device data and/or network data, querying, using the computing system, the one or more second databases to determine whether the one or more second databases contain at least one of device data or network data that are associated with the second device; and sending, using the computing system and to the one or more servers, a response to the request, the response comprising data that is based at least in part on data obtained from at least one of the first database or the one or more second databases; and/or the like.

According to some embodiments, the method may further comprise: providing, using the computing system, a probe UI to the user, the probe UI comprising at least one of: (a) a search tool configured to provide the user with one or more of options to search for one or more third devices among the plurality of layer 4 devices, or options to provide information regarding the one or more third devices; (b) a probe management tool configured to provide the user with one or more of options to search for one or more eighth software-based network probes and to provide information regarding the one or more eighth software-based network probes, options to create one or more ninth software-based network probes, options to modify a tenth software-based network probe, options to upload an eleventh software-based network probe, options to move one or more twelfth software-based network probes, options to download one or more thirteenth software-based network probes, or options to start or stop one or more fourteenth software-based network probes; and to generate or update probe configuration files for one or more fifteenth software-based network probes; or (c) a node tester tool configured to provide the user with one or more of options for selecting a fourth device among the plurality of layer 4 devices to test connectivity and/or access to the layer 4 device ("network node"), or options to connect to a probe manager managing one or more sixteenth software-based network probes used to monitor the selected fourth device; and/or the like.

In another aspect, a system may comprise a computing system, which may comprise at least one first processor and a first non-transitory computer readable medium communicatively coupled to the at least one first processor. The first non-transitory computer readable medium may have stored thereon computer software comprising a first set of instructions that, when executed by the at least one first processor, causes the computing system to: receive, from at least one first software-based network probe among a first plurality of software-based network probes, a first alert associated with a first device among a plurality of layer 4 devices that is each disposed within at least one first network among a plurality of networks, the layer 4 devices corresponding to open systems interconnection ("OSI") model's transport layer, the first alert comprising first alert data; parse the first alert data in the received first alert; store, in a first database, the parsed first alert data in a standardized format as parsed and formatted first alert data; perform, using an enrichment system, enrichment of the first alert data, by: retrieving first enrichment data from one or more second databases, the first enrichment data comprising at least one of first device data associated with the first device or first network data associated with a network in which the first device is disposed; and adding the first enrichment data to the parsed and formatted first alert data stored in the first database to form first consolidated alert data; and send the first consolidated alert data to a fault management system for display to a user to facilitate addressing of the first alert by the user.

In some embodiments, the computing system may comprise at least one of a network management system server, a node broker system, a probe manager, the fault management system, a network operations center ("NOC") computing system, a server over a network, a cloud computing system, or a distributed computing system, and/or the like. In some instances, the plurality of layer 4 devices may comprise at least one of a layer 4 switch, a gateway device, a network node, a gateway node, a firewall, an optical network switch and routing platform, a wavelength division multiplexing ("WDM")-based optical transport network system, or a network transmission system, and/or the like.

According to some embodiments, the first plurality of software-based network probes may comprise at least one of one or more translation language protocol ("TL1")-based software-based network probes, one or more passive software-based network probes configured to passively receive alert data, one or more active software-based network probes configured to actively poll and/or ping layer 4 devices for alert data, or one or more combination software-based network probes that combine capabilities of the passive and active software-based network probes, and/or the like.

In yet another aspect, a method may comprise: generating, using a computing system, one or more first software-based network probes among a first plurality of software-based network probes, the first plurality of software-based network probes being configured to: monitor a plurality of layer 4 devices that is each disposed within at least one first network among a plurality of networks, the layer 4 devices corresponding to open systems interconnection ("OSI") model's transport layer, the first alert comprising first alert data; and send alert data associated with one or more first devices among the plurality of layer 4 devices in response to determining an alert situation associated with the one or more first devices has occurred.

In some embodiments, generating the one or more first software-based network probes may comprise at least one of: generating, using the computing system, one or more second software-based network probes, based on corresponding one or more templates each for a particular type and/or model of layer 4 device among the plurality of layer 4 devices; generating, using the computing system and an automated bulk probe generation and deployment system, a second plurality of software-based network probes among the first plurality of software-based network probes, based at least in part on parameters provided by a user in a probe user interface ("UI"); generating, using the computing system and an add/remove node tool ("ANT"), one or more third software-based network probes one at a time, based at least in part on user input via a UI of the ANT; or generating, using the computing system, one or more fourth software-based network probes, by building a configuration file for each software-based network probe, storing each configuration file in a probe database, and starting probe processes for each fourth software-based network probe based on the corresponding configuration file; and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-5 illustrate some of the features of the method, system, and apparatus for implementing network management, and, more particularly, to methods, systems, and apparatuses for implementing software-based network probes for monitoring network devices for fault management, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

Figure 1B:
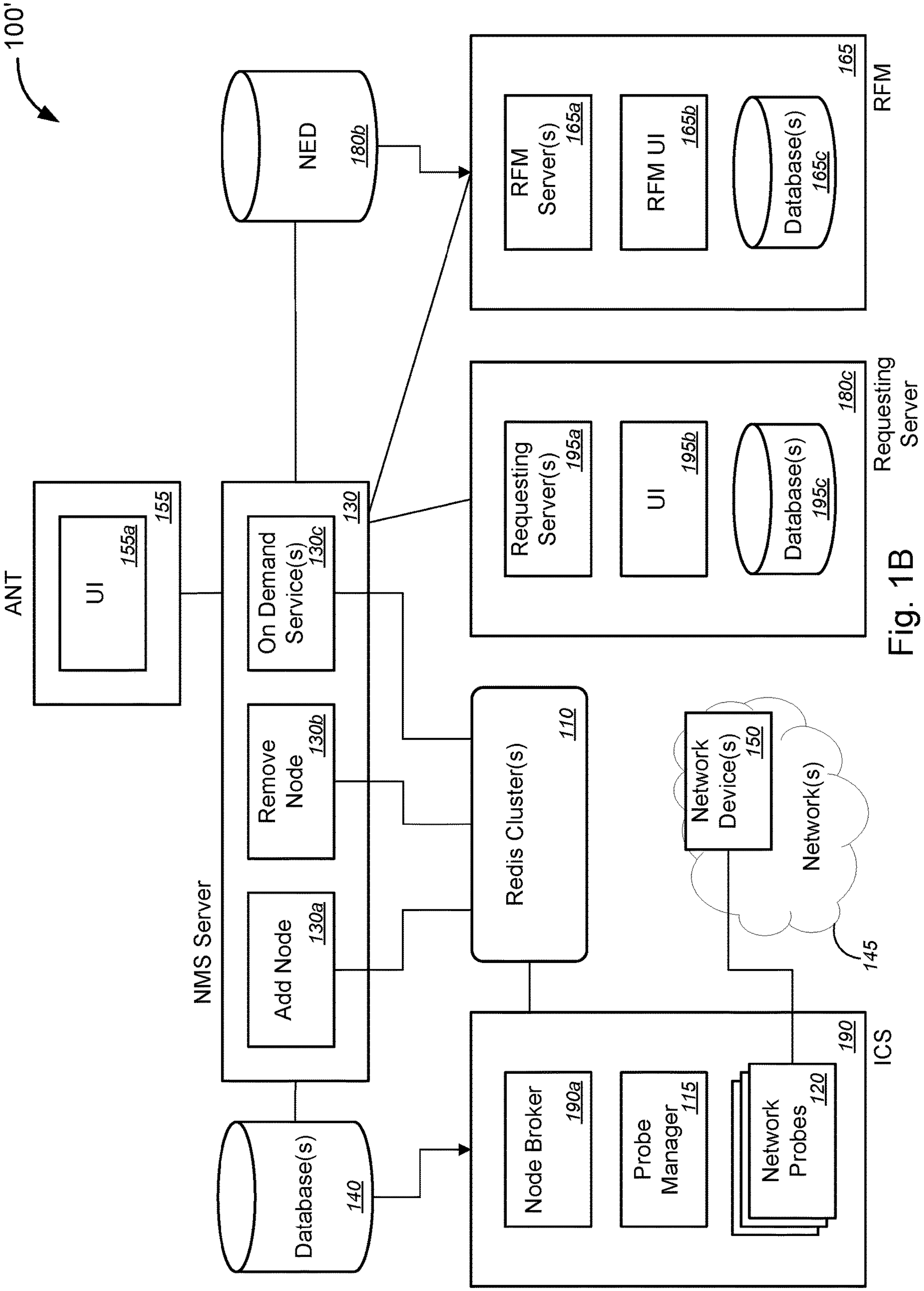

With reference to the figures, FIGS. 1A and 1B are schematic diagrams illustrating various non-limiting examples 100 and 100' of systems for implementing software-based network probes for monitoring network devices for fault management, in accordance with various embodiments.

In the non-limiting embodiment of FIG. 1A, system 100 may comprise a computing system 105, which is a system that is configured to receive and normalize (and, in some cases, enrich) alerts for and/or from network devices (particularly, layer 4 devices corresponding to open systems interconnection ("OSI") model's transport layer, or the like) that are disposed in one or more disparate networks, and to send the alert data to a fault management system (e.g., real-time fault management system ("RFM") 165, or the like) for display to a user to facilitate addressing of the alert by the user. In some cases, the users may include, without limitation, technicians who add or remove network devices and/or people who need access to such network devices, as listed or identified by network operations center ("NOC") managers, or the like.

In some embodiments, the computing system 105 may include, without limitation, at least one of one or more first databases 110a and 110b, each including, but not limited to, at least one of a remote dictionary server ("Redis") database or cluster, a non-relational ("NoSQL") database, or a relational (or structured query language ("SQL")) database, and/or the like; one or more probe managers 115 configured to monitor and manage network probes; one or more code-based or software-based network probes 120 configured to passively and actively monitor network devices (in particular, layer 4 devices, or the like); one or more code-based or software-based passive probes 125 configured to passively monitor network devices (in particular, layer 4 devices, or the like); a network management system ("NMS") server or node broker 130 configured to coordinate with various user interfaces, databases, and the probe manager 115; a probe-on-demand ("POD") system 135 configured to generate and configure new software-based network probes; and one or more databases 140*a*, including, but not limited to, relational databases, or the like; and/or the like. These various processes, features, and/or functionalities of the computing system 105 are performed autonomously with minimal if any input from the user (except for entry of parameters of software-based network probes and/or where to deploy them, or the like).

System 100 may further comprise external database(s) 140*b* (which is external to, yet communicatively coupled with computing system 105, or the like), a plurality of networks 145*a*-145*n* (collectively, "networks 145" or the like); one or more network devices 150*a*-150*n* (collectively, "network devices 150" or the like) that are located or disposed in the networks 145; add/remove node tool ("ANT") 155; probe user interface ("UI") 160; RFM 165; user devices 170*a*-170*n* (collectively, "user devices 170" or the like) associated with or used by one or more users (as described above); one or more networks 175 that provide the user devices 170 with access to ANT 155, probe UI 160, and/or RFM 165, or the like; requesting servers/databases ("DBs") 180*a*-180*n*; and/or network(s) 185 on which the requesting servers/DBs 180 may be disposed, and/or the like. In some cases, the plurality of networks 150 may include, but is not limited to, two or more disparate networks utilizing different alert management protocols and different fault management protocols. In some embodiments, the components of the computing system 105 (as well as ANT 155, probe UI 160, and/or RFM 165, or the like) may be implemented using virtual machine implementations and/or other code-based or software-based implementations, or the like.

In some embodiments, the computing system may include (or further include), but is not limited to, at least one of a network management system server, a node broker system, a probe manager, the fault management system, a network operations center ("NOC") computing system, a server over a network, a cloud computing system, or a distributed computing system, and/or the like. In some instances, the plurality of networks may include two or more disparate networks utilizing different alert management protocols and different fault management protocols. In some cases, the first consolidated alert data may comprise real-time or near-real-time consolidated alert data, and the fault management system may comprise a real-time fault management system ("RFM") that displays the real-time or near-real-time consolidated alert data. In some embodiments, the Redis database or cluster 110*a* and/or 110*b* may be a non-relational (or "non-SQL" or "NoSQL") database that is also an in-memory data structure store that may be used as a distributed, in-memory key-value database, cache, and message broker, and supports different types of abstract data structures, including, but not limited to, at least one of strings, lists, maps, sets, sorted sets, HyperLogLogs, bitmaps, streams, or spatial indices, and/or the like. In the various embodiments, the Redis database may be used as one or more Redis queues. In some cases, the fault management system may include, without limitation, RFM 165, which is configured to display real-time or near-real-time consolidated alert data.

In some instances, the one or more network devices 150 may each include, without limitation, a layer 4 device including, but not limited to, at least one of a layer 4 switch, a gateway device, a network node, a gateway node, a firewall, an optical network switch and routing platform, a wavelength division multiplexing ("WDM")-based optical transport network system, or a network transmission system, and/or the like. In some cases, the one or more software-based network probes 120 and/or 125 may each include, without limitation, at least one of one or more translation language protocol ("TL1")-based software-based network probes, one or more passive software-based network probes configured to passively receive alert data, one or more active software-based network probes configured to actively poll and/or ping layer 4 devices for alert data, or one or more combination software-based network probes that combine capabilities of the passive and active software-based network probes, and/or the like. In some instances, the combination software-based network probes may include the TL1-based software-based network probes, as TL1-based software-based network probes include a passive receiver and an active poller. In some cases, the passive software-based network probes may receive at least one of pings, simple network management protocol ("SNMP") trap messages, system logging protocol ("Syslog") messages, secure shell ("SSH") alerts, or teletype network ("Telnet") alerts, and/or the like.

In some embodiments, networks 145, 175, and/or 185—which may be the same or different networks—may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the networks 145, 175, and/or 185 may include an access network of the service provider (e.g., an Internet service provider ("ISP")). In another embodiment, the networks 145, 175, and/or 185 may include a core network of the service provider and/or the Internet.

In the non-limiting example of FIG. 1A, the one or more probe managers 115 and the network probes 120 may be disposed or stored in Redis cluster 110*a*, at least until deployed on or near a network device(s) 150 and/or network(s) 145, or the like. Similarly, the one or more passive probes 125 may be disposed or stored in Redis cluster 110*b*, at least until deployed on or near a network device(s) 150 and/or network(s) 145, or the like. In some embodiments, as shown, e.g., in the non-limiting example of FIG. 1A, each probe manager 115 may be communicatively coupled with each of at least one of one or more network probes 120, database(s) 140*a* or 140*b*, and NMS server or node broker 130, or the like. In some cases, the network probes 120 and/or 125 may directly or indirectly send data regarding one or more network devices 150*a*-150*n* to RFM 165. In some instances, NMS server or node broker 130 may be communicatively coupled with each of at least one of one or more probe managers 115, POD 135, ANT 155, probe UI 160, RFM 165, or one or more requesting servers/DBs 180*a*-180*n*, and/or the like.

With reference to the non-limiting example of FIG. 1B, system 100' may comprise one or more Redis clusters 110, NMS server 130, database(s) 140, ANT 155, Intelligent Configuration System ("ICS") 190, network device(s) 150 disposed in network(s) 145, network database(s) ("NEDs") 180*b*, requesting server(s) 180*c*, and/or RFM 165, and/or the like. In some embodiments, NMS server 130 may include, without limitation, one or more services or functionalities, including, but not limited to, at least one of an add-node functionality 130*a*, a remove-node functionality 130*b*, or an on-demand service(s) functionality 130*c*, and/or the like. In some cases, ANT 155 may include a UI 155*a*, or the like. In some instances, ICS 190 may include, but is not limited to, at least one of node broker 190*a* (similar to the node broker aspect of NWS server or node broker 130 of FIG. 1A, or the like), prober manager 115, and/or one or more network probes 120. In some cases, requesting server 180*c* may include, without limitation, at least one of requesting server(s) 195*a*, UI 195*b*, and/or database(s) 195*c*, and/or the like. In some instances, RFM 165 may include, but is not limited to, at least one of RFM server(s) 165*a*, RFM UI 165*b*, and/or database(s) 165*c*, and/or the like.

According to some embodiments, e.g., in the non-limiting example of FIG. 1B, network probes 120 may be disposed in ICS 190, at least until deployed on or near a network device(s) 150 and/or network(s) 145, or the like. In some cases, ICS 190 may be communicatively coupled with at least one of Redis cluster(s) 110, database(s) 140, network(s) 145, and/or network device(s) 150, or the like. In some instances, NMS server 130 may be communicatively coupled with each of at least one of Redis cluster(s) 110, database(s) 140, ANT 155, NED 180*b*, RFM 165, and/or requesting server 180*c*, and/or the like.

In some embodiments, Redis cluster(s) 110, probe manager 115, network probes 120, NMS server 130, database(s) 140, ANT 155, RFM 165, NED 180*b*, and requesting server 180*c* of system 100' of FIG. 1B may be similar, if not identical, to database(s) 110*a* or 110*b*, probe manager 115, network probes 120 and/or 125, NMS server aspect of NMS server or node broker 130, database(s) 140*a* or 140*b*, ANT 155, RFM 165, the database aspect of requesting servers/DBs 180*a*-180*n*, and the requesting server aspect of requesting servers/DBs 180*a*-180*n*, respectively, of system 100 of FIG. 1A, and the description of these components of system 100 of FIG. 1A are similarly applicable to the corresponding components of system 100' of FIG. 1B.

In operation, with respect to either system 100, system 100', or both, one or more of the computing system 105, the one or more probe managers 115, the NMS server 130, and/or the node broker 130 or 190*a*, and/or the like, may be configured or further configured to: receive, from at least one first software-based network probe among a first plurality of software-based network probes (e.g., the one or more software-based network probes 120 and/or 125, or the like), a first alert associated with a first device among a plurality of layer 4 devices (e.g., the one or more network devices 150*a*-150*n*, or the like) that is each disposed within at least one first network among a plurality of networks (e.g., network(s) 145, or the like), the first alert comprising first alert data; parse the first alert data in the received first alert; and store, in a first database (e.g., Redis database or cluster 110*a*, 110*b*, and/or 110, or the like), the parsed first alert data in a standardized format as parsed and formatted first alert data; and/or the like.

In some cases, an enrichment system (e.g., NMS server 130, or the like) may perform enrichment of the first alert data, by: retrieving first enrichment data from one or more second databases (e.g., database(s) 140*a*, 140*b*, or 140, or NED 180*b*, or the like), the first enrichment data including, without limitation, at least one of first device data associated with the first device or first network data associated with a network in which the first device is disposed; and adding the first enrichment data to the parsed and formatted first alert data stored in the first database to form first consolidated alert data; and send the first consolidated alert data to a fault management system (e.g., RFM 165, or the like) for display to a user to facilitate addressing of the first alert by the user.

In some embodiments, one or more of the computing system 105 or the NMS server 130 may be further configured to: generate one or more second software-based network probes among the first plurality of software-based network probes. In some cases, the one or more second software-based network probes comprise the at least one first software-based network probe. In some instances, generating the one or more second software-based network probes may comprise at least one of: generating one or more third software-based network probes, based on corresponding one or more templates each for a particular type and/or model of layer 4 device among the plurality of layer 4 devices; generating, using an automated bulk probe generation and deployment system, a second plurality of software-based network probes among the first plurality of software-based network probes, based at least in part on parameters provided by a user in a probe user interface ("UI"); generating, using ANT 155, one or more fourth software-based network probes one at a time, based at least in part on user input via a UI of the ANT; or generating one or more fifth software-based network probes, by building a configuration file for each software-based network probe, storing each configuration file in a probe database (e.g., database(s) 140*a* or 140*b*, which, in some cases, may be a MySQL or system administrator database ("SADB"), or the like), and starting probe processes for each fifth software-based network probe based on the corresponding configuration file; and/or the like. In some instances, the generation of software-based network probes allows for flexible configurations of such probes, and the backend tools and ecosystem around the probes (e.g., TL1 probes, or the like) support, enable, and facilitate such flexible probe generation. For example, templates for particular type and/or model of layer 4 device allows probes to be quickly built or generated. For automated bulk probe generation and deployment (which may be part of the probe UI, as shown and described with respect to FIGS. 3A-3D, or the like), a user provides parameters (including, but not limited to, at least one of template, minimum and/or maximum number of devices monitored per probe (e.g., 70-75 devices per probe, or the like), IP address, password, configuration, device name, and/or the like), and the system generates and either sends out the generated probes to the user via e-mail (with probes attached), stores the generated probes on a server (with auto-configuration), and/or saves the generated probes in a database. The ANT allows for manual add and remove functionality one probe at a time, as shown and described below with respect to FIGS. 2A-2C, or the like).

According to some embodiments, at least one of the computing system 105 or probe manager(s) 115 may be further configured to perform one or more of: monitoring the first plurality of software-based network probes; in response to a determination that a sixth software-based network probe among the first plurality of software-based network probes is unresponsive, sending a command to the sixth software-based network probe to restart; or in response to a new network device being added to a second network among the plurality of networks, selecting a seventh software-based network probe among the first plurality of software-based network probes to monitor the new network device, and sending commands to the selected seventh software-based network probe to monitor the new network device; and/or the like. In some cases, at least one of the computing system 105 or probe manager(s) 115 may be further configured to normalize the first consolidated alert data relative to a plurality of consolidated alert data that is stored in the first database. In some instances, the probe manager 115 may monitor particular probes, may load particular probes into or from a database(s), may send messages to probes to monitor new devices, may perform health checks on probes (e.g., may run processes on a server, and if it cannot find a process on probe 1, may send a command to start or restart probe 1, or the like).

In some embodiments, one or more of the computing system 105 or the NMS server 130 may be further configured to: receive, from one or more servers in the plurality of networks (e.g., requesting servers/DBs 180*a*-180*n*, or the like), a request for data associated with a second device among the plurality of layer 4 devices; query the first database to determine whether the first database contains data including at least one of alert data, device data, or network data that are associated with the second device; based on a determination that the first database does not contain device data and/or network data, query the one or more second databases to determine whether the one or more second databases contain at least one of device data or network data that are associated with the second device; and send, to the one or more servers, a response to the request, the response comprising data that is based at least in part on data obtained from at least one of the first database or the one or more second databases; and/or the like.

Figure 3A:
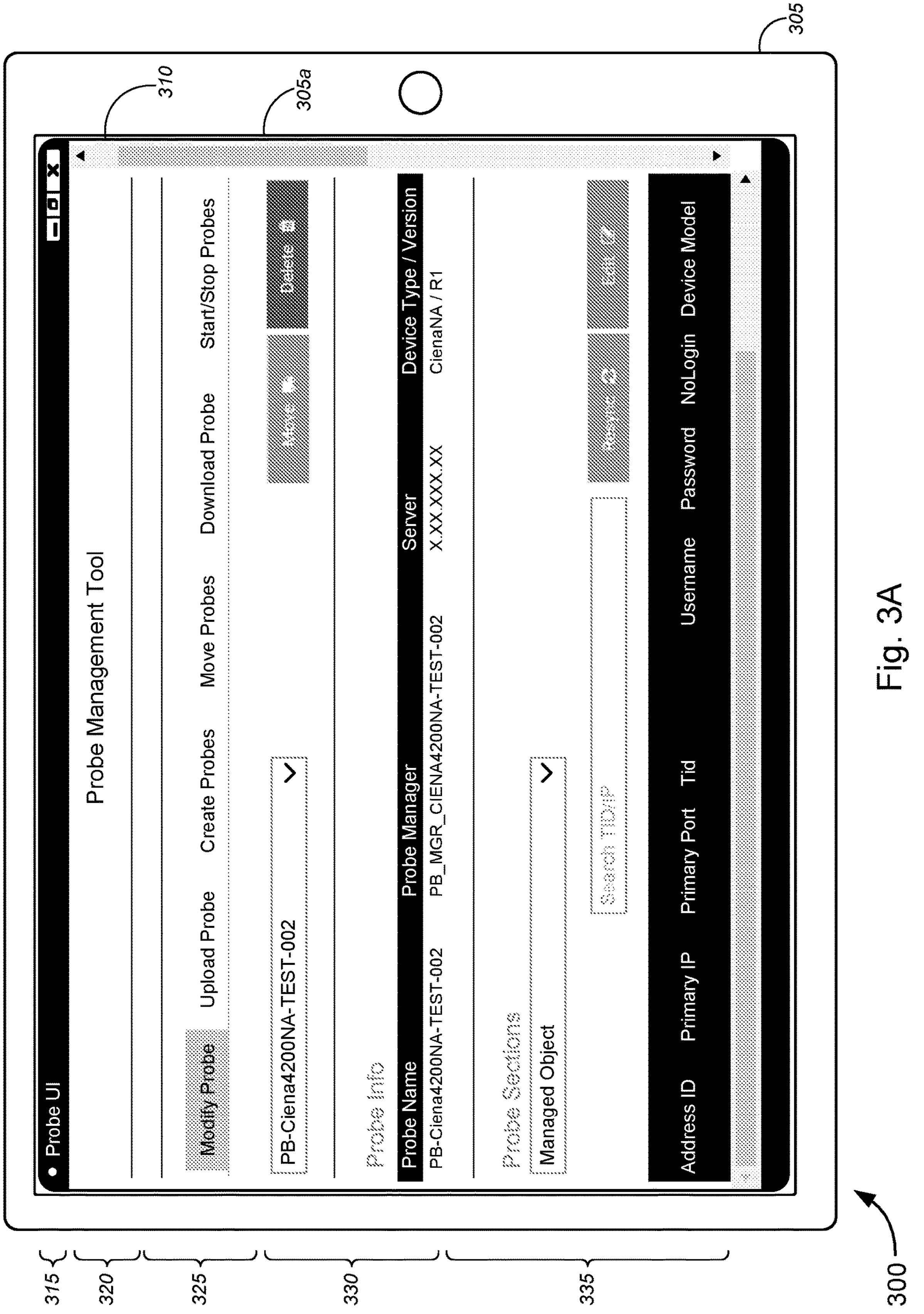
FIGS. 3A-3D are diagrams illustrating various non-limiting examples of user interfaces for a probe user interface system that may be used when implementing software-based network probes for monitoring network devices for fault management, in accordance with various embodiments.
Figure 3B:
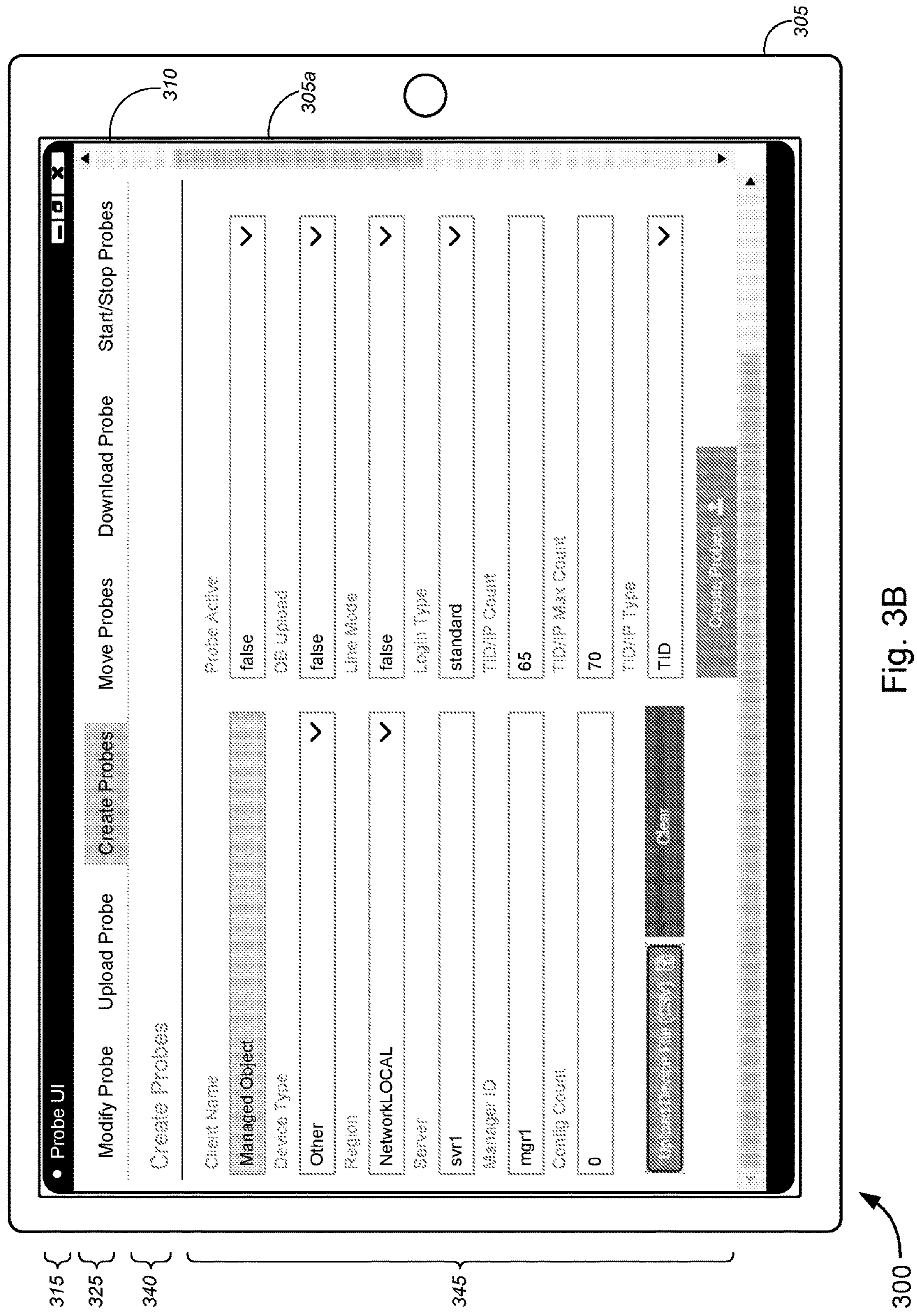
Figure 3C:
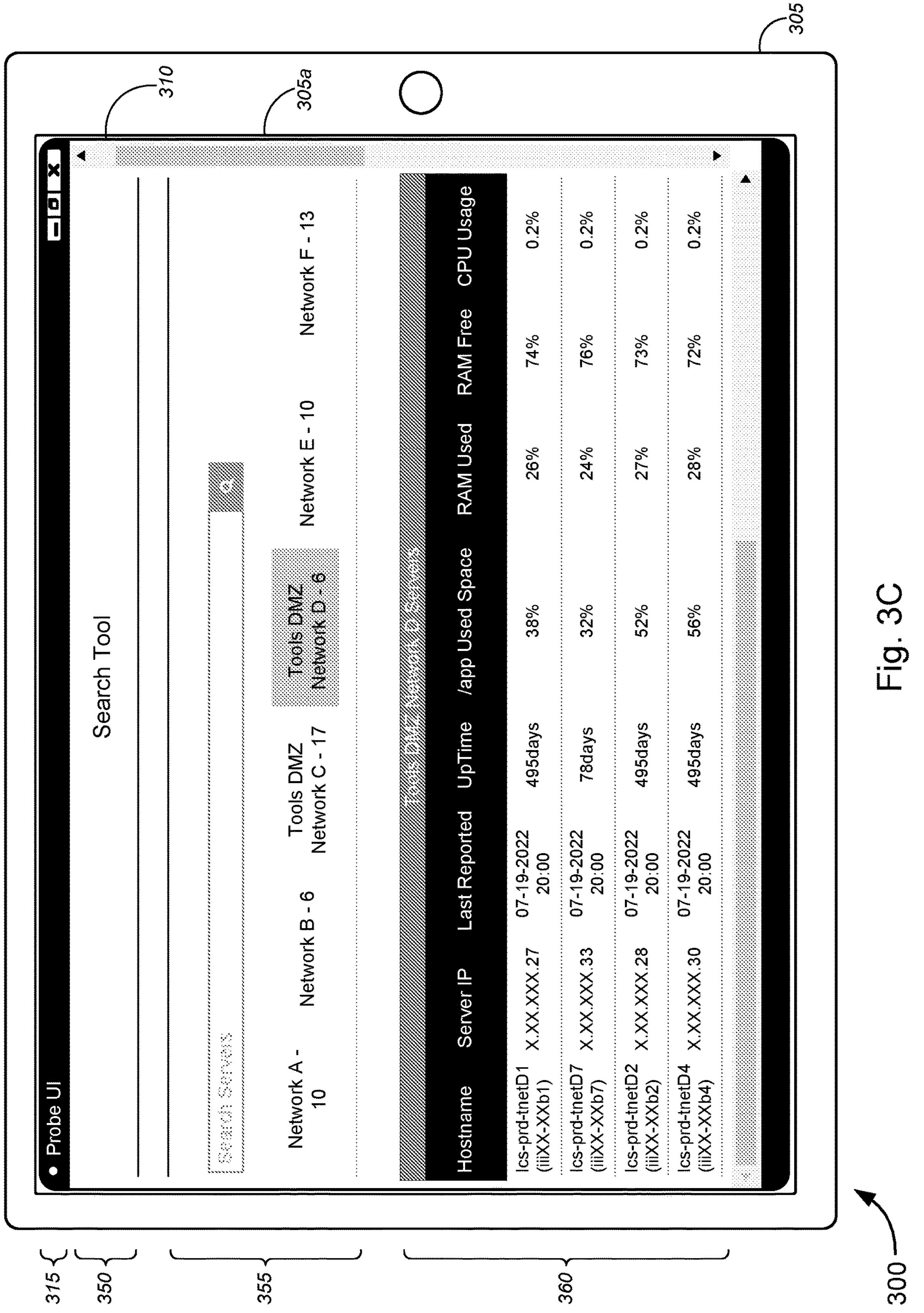
Figure 3D:
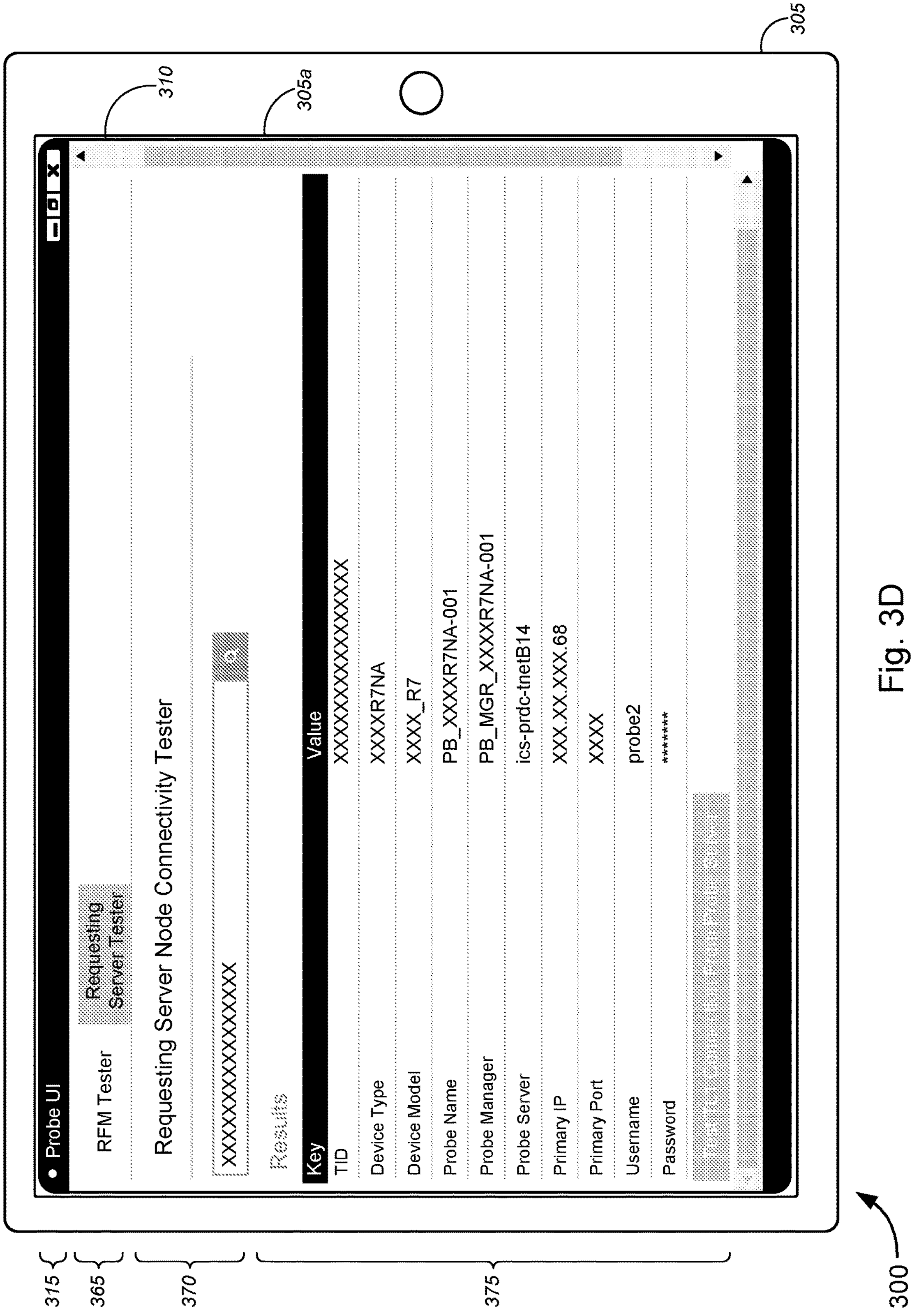

According to some embodiments, one or more of the computing system 105 or the NMS server 130 may be further configured to: provide a probe UI 160 to the user (via network(s) 175 and user device 170, or the like). In some instances, the probe UI may include, without limitation, at least one of: (a) a search tool (e.g., as shown in FIG. 3C, or the like) configured to provide the user with one or more of options to search for one or more third devices among the plurality of layer 4 devices, or options to provide information regarding the one or more third devices; (b) a probe management tool (e.g., as shown in FIGS. 3A and 3B, or the like) configured to provide the user with one or more of options to search for one or more eighth software-based network probes and to provide information regarding the one or more eighth software-based network probes, options to create one or more ninth software-based network probes, options to modify a tenth software-based network probe, options to upload an eleventh software-based network probe, options to move one or more twelfth software-based network probes, options to download one or more thirteenth software-based network probes, or options to start or stop one or more fourteenth software-based network probes; and to generate or update probe configuration files for one or more fifteenth software-based network probes; or (c) a node tester tool (e.g., as shown in FIG. 3D, or the like) configured to provide the user with one or more of options for selecting a fourth device among the plurality of layer 4 devices to test connectivity and/or access to the layer 4 device ("network node"), or options to connect to a probe manager managing one or more sixteenth software-based network probes used to monitor the selected fourth device; and/or the like.

In the manner described above, a user may be provided with a "whole picture" of an alert. These and other functions of the system 100 (and its components) are described in greater detail below with respect to FIGS. 2-4.

Figure 2A:
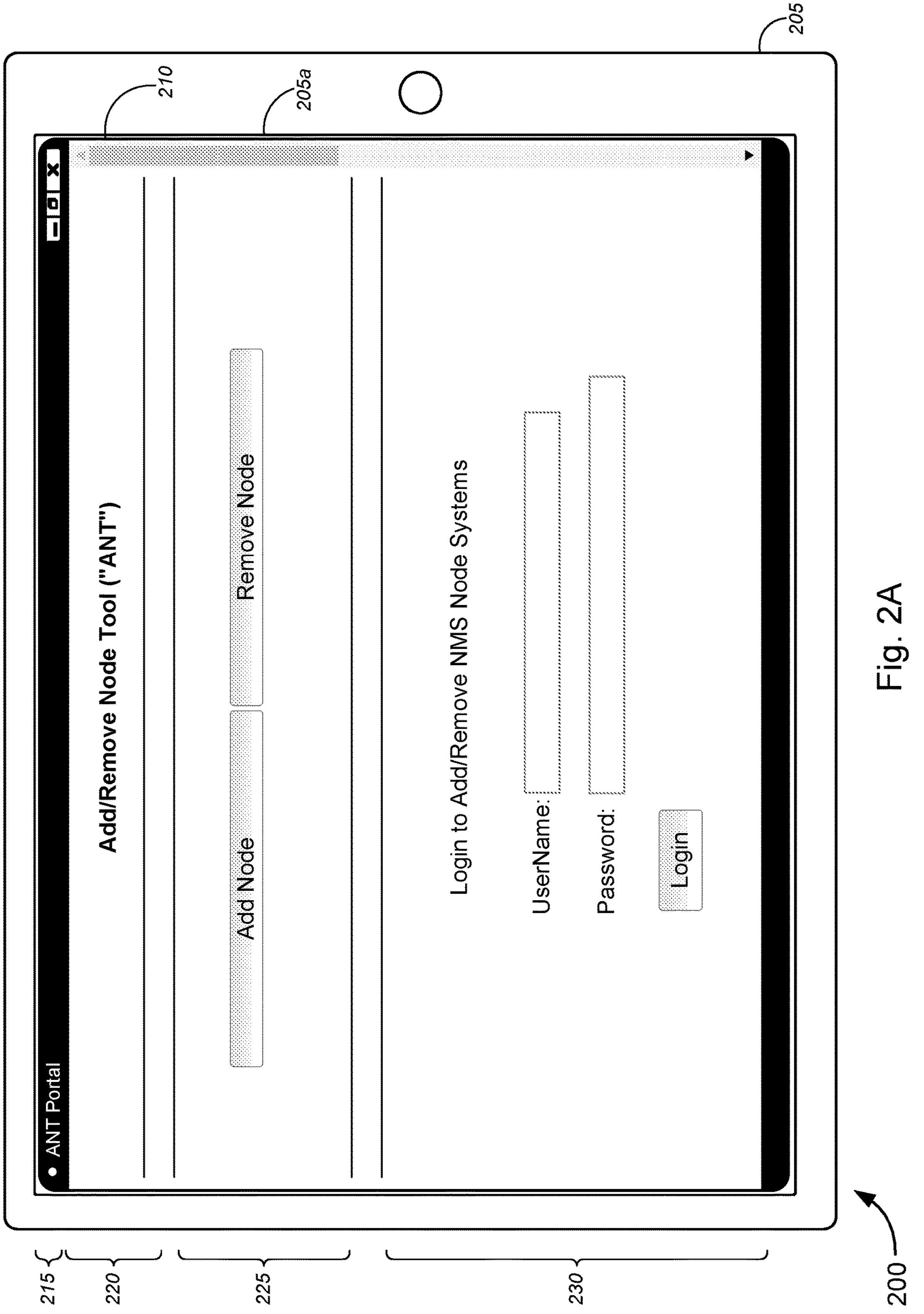
FIGS. 2A-2C are diagrams illustrating various non-limiting examples of user interfaces for an add/remove node tool ("ANT") that may be used when implementing software-based network probes for monitoring network devices for fault management, in accordance with various embodiments.
Figure 2B:
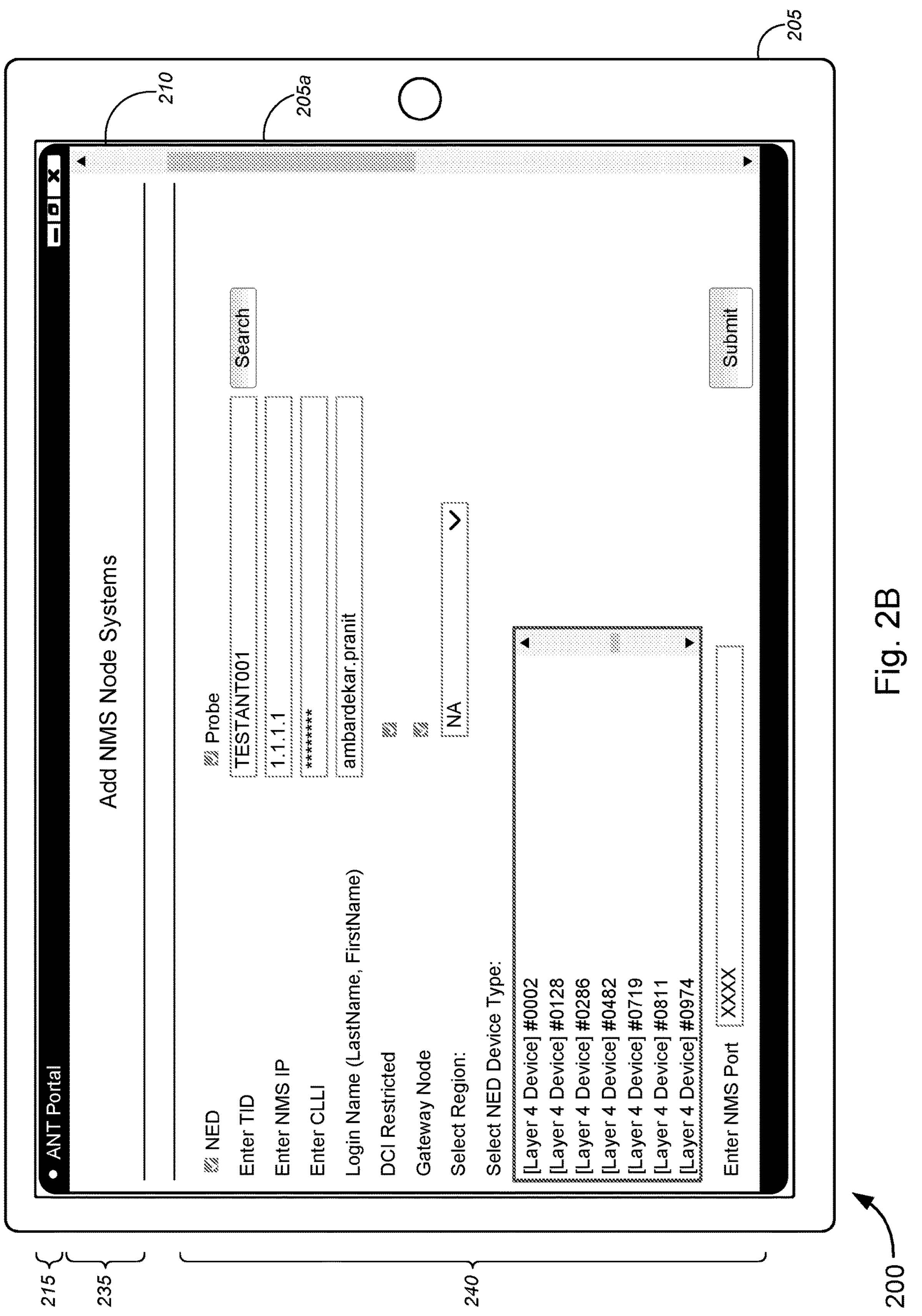
Figure 2C:
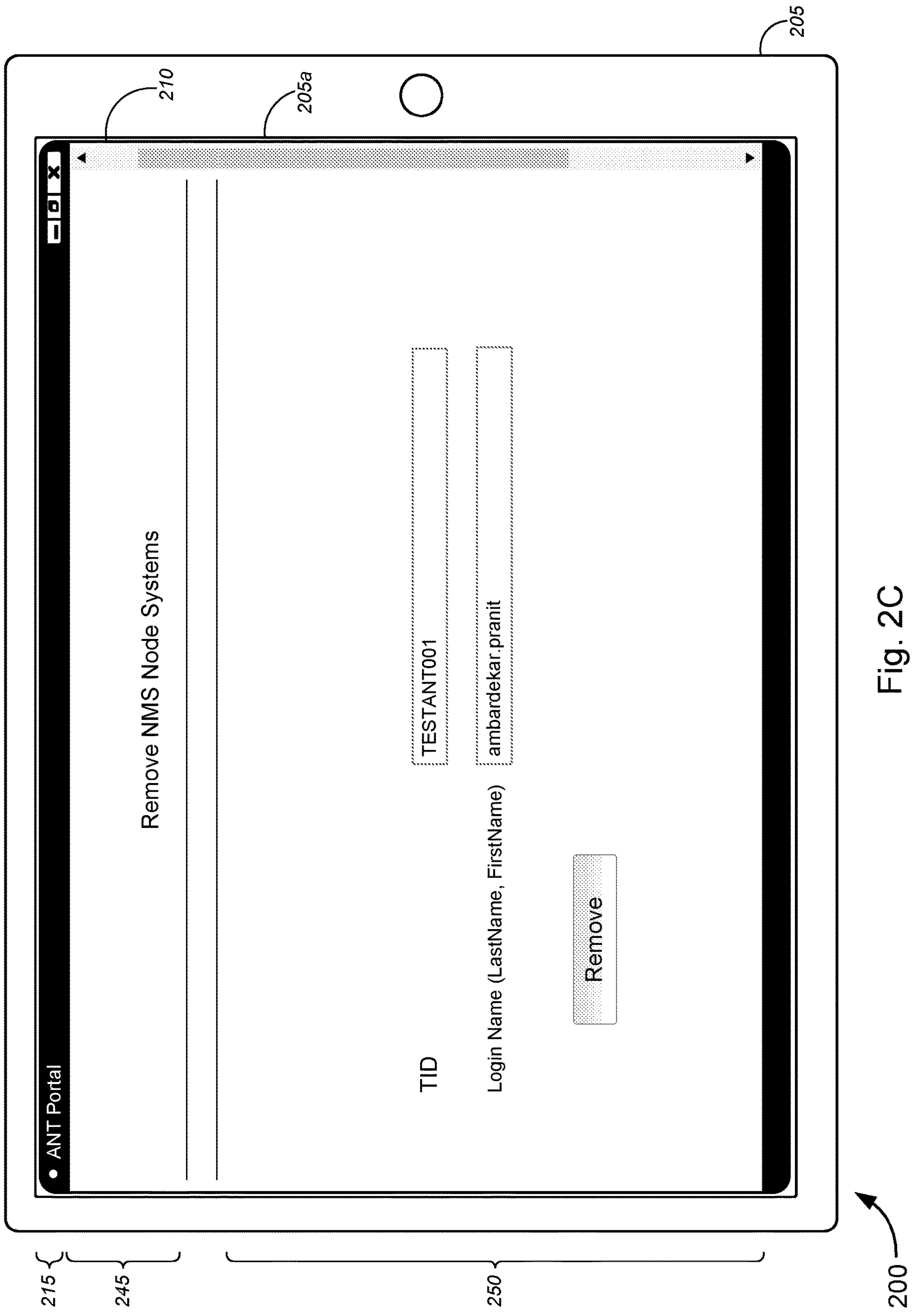

FIGS. 2A-2C (collectively, "FIG. 2") are diagrams illustrating various non-limiting examples 210 of user interfaces for an add/remove node tool ("ANT") that may be used when implementing software-based network probes for monitoring network devices for fault management, in accordance with various embodiments.

The embodiment as represented in FIG. 2 is merely illustrative and is not intended to limit the scope of the various embodiments. For example, although a tablet computer is shown as the user device 200, any suitable user device—including, but not limited to, user device(s) 170, which may each include, but is limited to, one of a desktop computer, a laptop computer, a tablet computer, a smart phone, a mobile phone, a NOC computing system or console, or any suitable device capable of communicating with computing system 105 (or with ANT 155 or ANT UI 155*a*, or the like) via a web-based portal, an API, a server, an app, or any other suitable communications interface, or the like, over network(s) 175, and the like—may be used.

As shown in the embodiment of FIG. 2, user device 200 may comprise a device housing 205 and a display 205*a* (which may be a touchscreen display or a non-touchscreen display). An app, an application window, program window or portal (e.g., web portal or the like) may be displayed on the display 205*a*. In the non-limiting example of FIG. 2, the app or portal 210 running on the user device 200 is a user interface illustrating an ANT UI (in some cases, including "ANT Portal" or the like), although the various embodiments are not limited to such an app or portal, as described herein, and can be any suitable app or portal. The app or portal 210 displayed in display 205*a* may provide a user (e.g., a technician, a telephone agent, a web-based agent, a chat agent, or other representative, etc. of the service provider, and/or the user as described above with respect to FIG. 1, or the like) with the ability, functionality, or options to add or remove nodes (or software-based network probes, such as network probes 120 and 125 of FIG. 1, or the like) for monitoring network devices (such as network devices 150*a*-150*n* or 150 of FIG. 1, or the like, which include layer 4 devices, or the like).

As shown in the non-limiting example of FIG. 2A, the app or portal 210 may include, without limitation, at least one of a header portion 215 (e.g., indicating the app or portal site as "ANT Portal" or the like), a first title portion 220 (e.g., indicating the functionality(ies) being offered by the ANT Portal, in this case, "Add/Remove Node Tool ("ANT")" or the like), a selection portion 225 (including virtual buttons or options for adding a node or removing a node, or the like), a login portion 230 (including fields for entering a username and a password, and a virtual button or option to login, or the like), and/or the like.

In response to successfully logging in and selecting the option to add a node, the user may be taken to a web page or other UI (e.g., as shown in FIG. 2B, or the like) for adding a node. As shown in the non-limiting example of FIG. 2B, the app or portal 210 may further include, but is not limited to, at least one of a second title portion 235 (e.g., indicating the functionality(ies) being offered by the ANT Portal, in this case, "Add NMS Node Systems" or the like), and an add node form section 240, and/or the like. The add node form section 240 may include, without limitation, at least one of one or more selection/deselection fields (e.g., for selecting or deselecting at least one of "NED," "Probe," "DCI Restricted," or "Gateway Node," or the like), one or more character entry fields (e.g., entering data for at least one of target identifier ("TID"; which is a unique name or ID of a network device, or the like), NMS IP address, a location code ("CLLI"), a login name (e.g., in last name, first name format, or the like), or NMS port, and/or the like), one or more drop-down lists (e.g., for selecting region and/or for selecting NED device type, and/or the like), or one or more virtual buttons or options (e.g., for searching for a device based on entered TID, for submitting the request to add a node, and/or the like), or the like.

In response to successfully logging in and selecting the option to remove a node, the user may be taken to a web page or other UI (e.g., as shown in FIG. 2C, or the like) for removing a node. As shown in the non-limiting example of FIG. 2C, the app or portal 210 may further include, but is not limited to, at least one of a third title portion 245 (e.g., indicating the functionality(ies) being offered by the ANT Portal, in this case, "Remove NMS Node Systems" or the like), and a remove node form section 250, and/or the like. The remove node form section 250 may include, without limitation, at least one of one or more character entry fields (e.g., entering data for at least one of TID, a login name (e.g., in last name, first name format, or the like), and/or the like), or one or more virtual buttons or options (e.g., for submitting the request to remove a node, and/or the like), or the like.

Herein, "X" and "*" in FIG. 2 represents redacted information, for the purposes of simplicity of illustration in this patent document, but would be visible to a user during regular use of the ANT UI (unless otherwise indicated).

FIGS. 3A-3D (collectively, "FIG. 3") are diagrams illustrating various non-limiting examples 310 of user interfaces for a probe user interface system that may be used when implementing software-based network probes for monitoring network devices for fault management, in accordance with various embodiments.

The embodiment as represented in FIG. 3 is merely illustrative and is not intended to limit the scope of the various embodiments. For example, although a tablet computer is shown as the user device 300, any suitable user device—including, but not limited to, user device(s) 170, which may each include, but is limited to, one of a desktop computer, a laptop computer, a tablet computer, a smart phone, a mobile phone, a NOC computing system or console, or any suitable device capable of communicating with computing system 105 (or with Probe UI 160) via a web-based portal, an API, a server, an app, or any other suitable communications interface, or the like, over network(s) 175, and the like—may be used.

As shown in the embodiment of FIG. 3, user device 300 may comprise a device housing 305 and a display 305*a* (which may be a touchscreen display or a non-touchscreen display). An app, an application window, program window or portal (e.g., web portal or the like) may be displayed on the display 305*a*. In the non-limiting example of FIG. 3, the app or portal 310 running on the user device 300 is a user interface illustrating a Probe UI (in some cases, including "Probe UI" or the like), although the various embodiments are not limited to such an app or portal, as described herein, and can be any suitable app or portal. The app or portal 310 displayed in display 305*a* may provide a user (e.g., a technician, a telephone agent, a web-based agent, a chat agent, or other representative, etc. of the service provider, and/or the user as described above with respect to FIG. 1, or the like) with the ability, functionality, or options to manage one or more probes (as shown, e.g., in FIGS. 3A and 3B, or the like), to search for servers (as shown, e.g., in FIG. 3C, or the like), to test a node (as shown, e.g., in FIG. 3D, or the like), or any suitable functionality of the probe UI (such as described herein in detail with respect to FIGS. 1 and 4, or the like).

As shown in the non-limiting example of FIG. 3A, the app or portal 310 may include, without limitation, at least one of a header portion 315 (e.g., indicating the app or portal site as "Probe UI" or the like), a title portion 320 (e.g., indicating the functionality(ies) being offered by the Probe UI, in this case, "Probe Management Tool" or the like), a tab portion 325 (including tabs for each functionality of the Probe Management Tool, including, but not limited to, "Modify Probe," "Upload Probe," "Create Probes," "Move Probes," "Download Probe," or "Start/Stop Probes," or the like), a probe modification and information portion 330 (including, but not limited to, at least one of an entry field for selecting a probe for modification, one or more virtual buttons or options (e.g., for moving or deleting the selected probe, or the like), or one or more display fields for displaying information about the selected probe (including, but not limited to, at least one of "Probe Name," "Probe Manager," "Server," or "Device Type/Version," and/or the like)), or a probe sections and display portion 335 (including, but not limited to, at least one of an entry field for selecting probe sections (e.g., "Managed Object," or the like), an entry field for searching for TID and/or IP with virtual buttons or options (e.g., for resyncing and/or editing TID, IP, and/or other data associated with the particular probe, or the like), or a display portion (e.g., for displaying data including, but not limited to, at least one of address IP, primary IP, primary port, TID, username, password, no login information, or device model, and/or the like)), and/or the like.

As shown in the non-limiting example of FIG. 3B, in response to selecting the tab for creating probes, the user may be taken to a tabbed portion that provides a form for creating probes, said form including a title portion 340 (e.g., indicating the tabbed form for "Create Probes" or the like) and a field entry portion 345 (including, but not limited to, at least one of one or more entry and/or drop-down fields (e.g., for entering and/or selecting at least one of "Client Name," "Device Type," "Region," "Server," "Manager ID," "Config Count," "Probe Active" state, "DB Upload" state, "Line Mode," "Login Type," "TID/IP Count," "TID/IP Max Count," or "TID/IP Type," and/or the like), or one or more virtual buttons or options (e.g., for uploading a device file, for clearing the form fields, and/or for submitting a request to create probes, and/or the like), or the like.

As shown in the non-limiting example of FIG. 3C, an example form for a search tool is shown. The form for the search tool may include a title portion 350 (e.g., indicating the functionality(ies) being offered by the Probe UI, in this case, "Search Tool" or the like), a search servers portion 355 (including, but not limited to, at least one of an entry field and virtual button or option to search for servers, or one or more virtual buttons, options, or tabs for selecting from a list of networks (in some cases, with a notation indicating number of servers; e.g., "Network A—10," "Network B—6," "Tools DMZ Network C—17," "Tools DMZ Network D—6," "Network E—10," or "Network F—13," and so on), and/or the like), and/or a display portion 360 (e.g., for displaying information associated with servers being searched, including, but not limited to, at least one "Hostname," "Server IP," "Last Reported" date and time, "UpTime" (e.g., in days, or the like), "/app Used Space," "RAM Used," "RAM Free," "CPU Usage," and so on), and/or the like.

As shown in the non-limiting example of FIG. 3D, an example form for a tester tool is shown. The form for the tester tool may include a tabbed portion 365 (including tabs for each functionality of the tester tool, including, but not limited to, "RFM Tester," or "Requesting Server Tester," or the like), a requesting server node connectivity tester portion 370 (including, but not limited to, at least one of an entry field and virtual button or option to search for a server node to test connectivity of, or the like), and a display portion 375 (e.g., for displaying information associated with the results of the search (including, but not limited to, at least one of "TID," "Device Type," "Device Model," "Probe Name," "Probe Manager," "Probe Server," "Primary IP," "Primary Port," "Username" of probe, or "Password" of probe, and so on)). The display portion 375 may further include a virtual button or option for testing the TL1 connection from a probe server, or the like.

Herein, "X" and "*" in FIG. 3 represents redacted information, for the purposes of simplicity of illustration in this patent document, but would be visible to a user during regular use of the Probe UI (unless otherwise indicated).

Figure 4A:
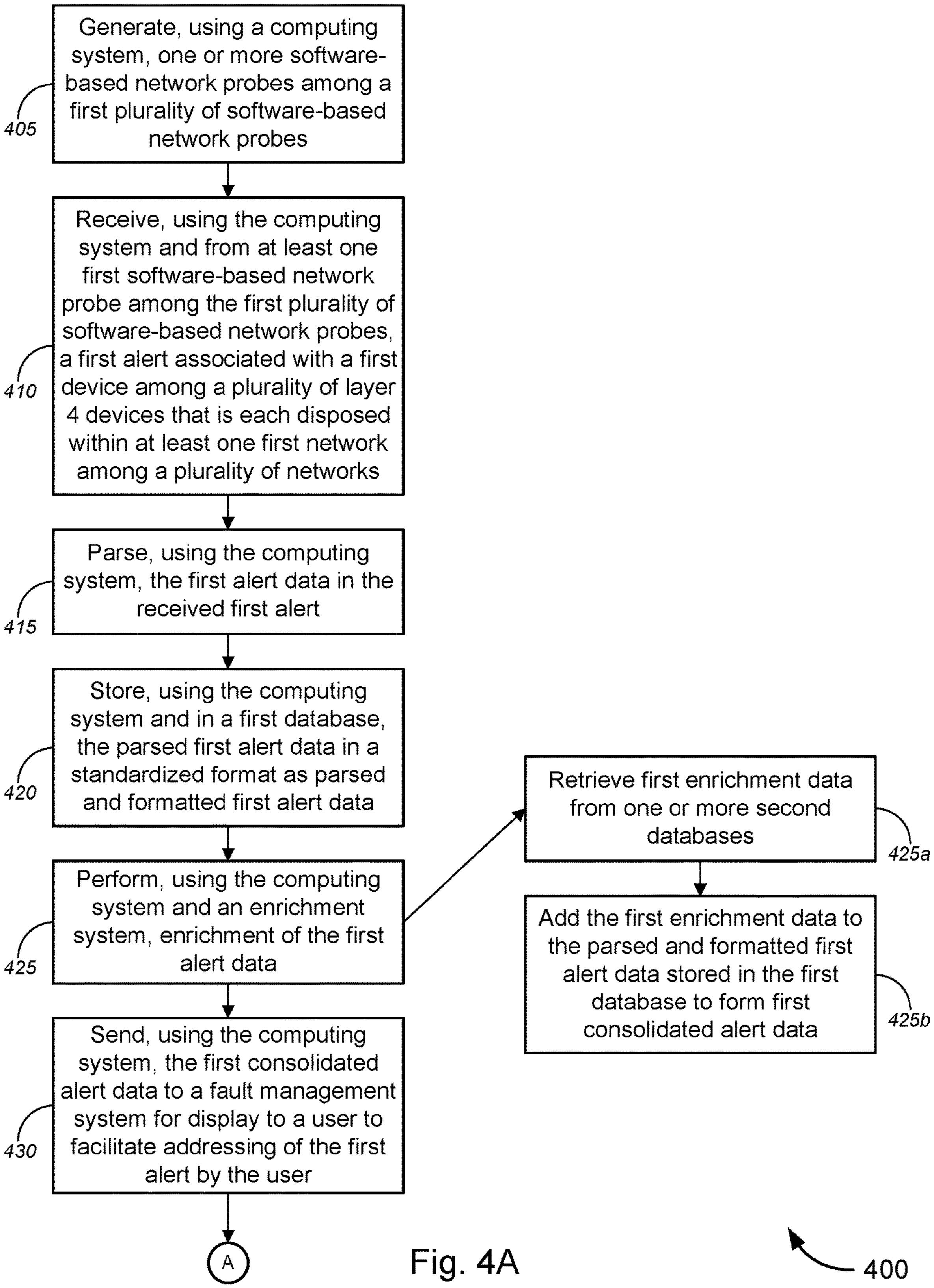
FIGS. 4A-4C are flow diagrams illustrating a method for implementing software-based network probes for monitoring network devices for fault management, in accordance with various embodiments.
Figure 4B:
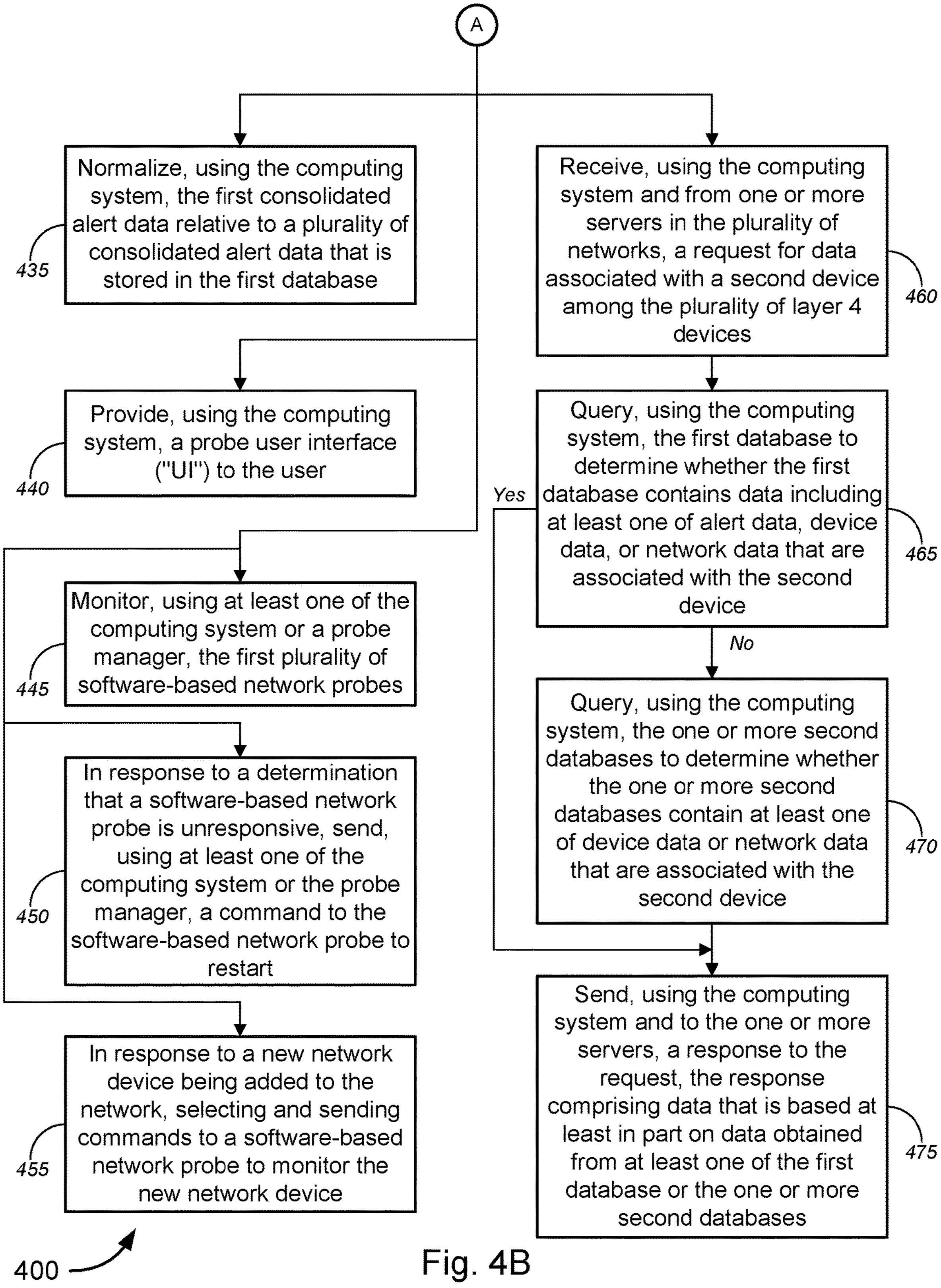
Figure 4C:
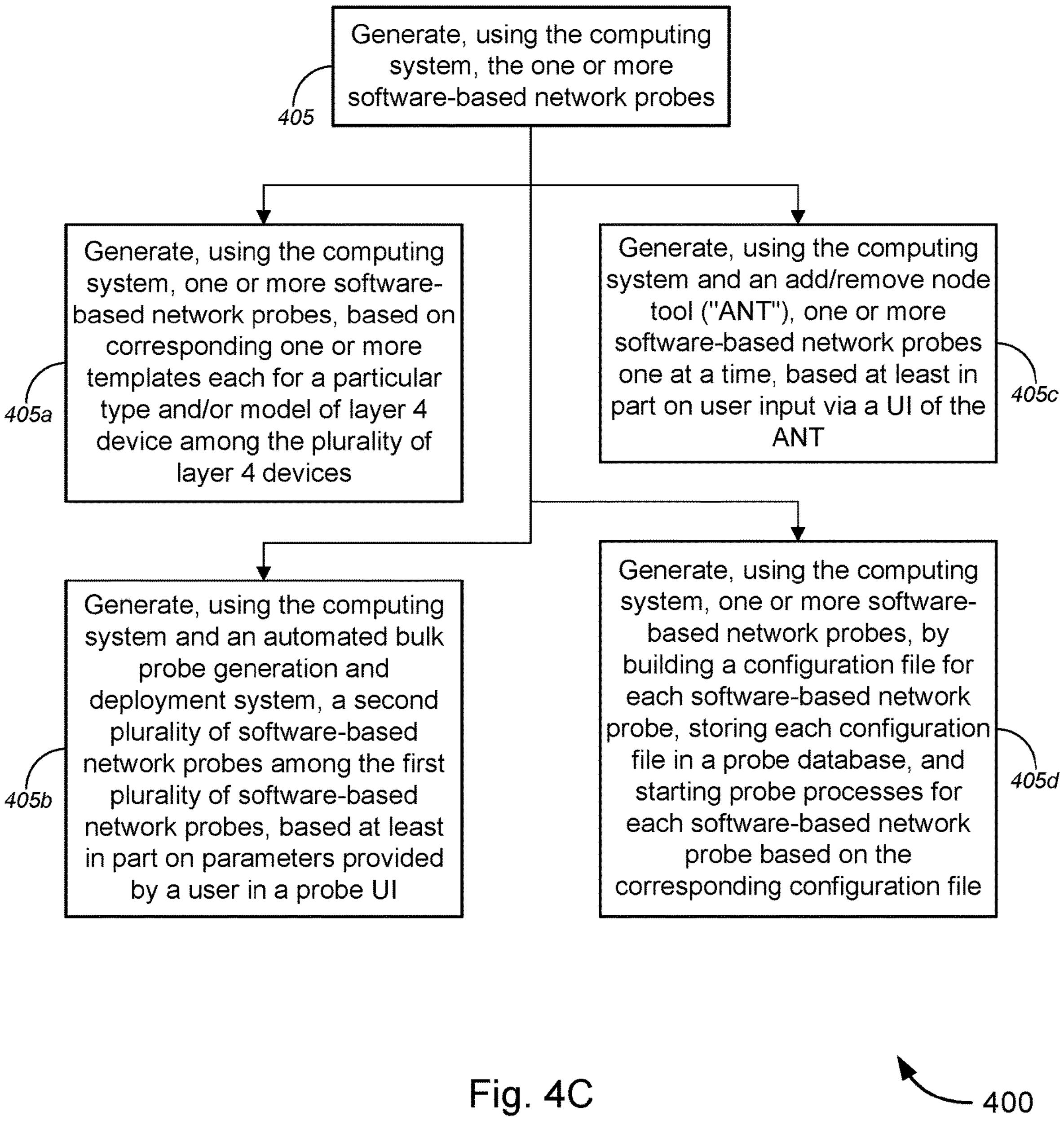

FIGS. 4A-4C (collectively, "FIG. 4") are flow diagrams illustrating a method 400 for implementing software-based network probes for monitoring network devices for fault management, in accordance with various embodiments. Method 400 of FIG. 4A continues onto FIG. 4B following the circular marker denoted, "A."

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 100', 210, and 310 of FIGS. 1A, 1B, 2, and 3, respectively (or components thereof), such methods may also be implemented using any suitable hardware (or software) implementation. Similarly, while each of the systems, examples, or embodiments 100, 100', 210, and 310 of FIGS. 1A, 1B, 2, and 3, respectively (or components thereof), can operate according to the method 400 illustrated by FIG. 4 (e.g., by executing instructions embodied on a computer readable medium), the systems, examples, or embodiments 100, 100', 210, and 310 of FIGS. 1A, 1B, 2, and 3 can each also operate according to other modes of operation and/or perform other suitable procedures.

In the non-limiting embodiment of FIG. 4A, method 400, at block 405, may comprise generating, using a computing system, one or more software-based network probes among a first plurality of software-based network probes. At block 410, method 400 may comprise receiving, using the computing system and from at least one first software-based network probe among the first plurality of software-based network probes, a first alert associated with a first device among a plurality of layer 4 devices that is each disposed within at least one first network among a plurality of networks. In some instances, the layer 4 devices correspond to open systems interconnection ("OSI") model's transport layer. In some cases, the first alert includes first alert data.

Method 400 may further comprise parsing, using the computing system, the first alert data in the received first alert (block 415); storing, using the computing system and in a first database, the parsed first alert data in a standardized format as parsed and formatted first alert data (block 420); performing, using the computing system and an enrichment system (e.g., NMS server 130 of FIG. 1, or the like), enrichment of the first alert data (block 425), by: retrieving first enrichment data from one or more second databases (e.g., database(s) 140*a*, 140*b*, or 140, or NED 180*b* of FIGS. 1A and/or 1B, or the like), the first enrichment data comprising at least one of first device data associated with the first device or first network data associated with a network in which the first device is disposed (block 425*a*); and adding the first enrichment data to the parsed and formatted first alert data stored in the first database to form first consolidated alert data (block 425*b*). Method 400 may further comprise, at block 430, sending, using the computing system, the first consolidated alert data to a fault management system for display to a user to facilitate addressing of the first alert by the user.

In some embodiments, the computing system may comprise at least one of a network management system server, a node broker system, a probe manager, the fault management system, a network operations center ("NOC") computing system, a server over a network, a cloud computing system, or a distributed computing system, and/or the like. In some instances, the plurality of networks comprises two or more disparate networks utilizing different alert management protocols and different fault management protocols. In some cases, the first database may comprise at least one of a remote dictionary server ("Redis") database, a non-relational ("NoSQL") database, or a relational ("SQL") database, and/or the like. In some cases, the first consolidated alert data may comprise real-time or near-real-time consolidated alert data, and the fault management system may comprise a real-time fault management system ("RFM") that displays the real-time or near-real-time consolidated alert data.

In some instances, the plurality of layer 4 devices may comprise at least one of a layer 4 switch, a gateway device, a network node, a gateway node, a firewall, an optical network switch and routing platform, a wavelength division multiplexing ("WDM")-based optical transport network system, or a network transmission system, and/or the like. In some cases, the first plurality of software-based network probes may comprise at least one of one or more translation language protocol ("TL1")-based software-based network probes, one or more passive software-based network probes configured to passively receive alert data, one or more active software-based network probes configured to actively poll and/or ping layer 4 devices for alert data, or one or more combination software-based network probes that combine capabilities of the passive and active software-based network probes, and/or the like.

Method 400 may continue onto one or more of the process at block 435 in FIG. 4B, the process at block 440 in FIG. 4B, the process at block 445 in FIG. 4B, or the process at block 460 in FIG. 4B, each following the circular marker denoted, "A."

At block 435 in FIG. 4B (following the circular marker denoted, "A," in FIG. 4A), method 400 may comprise normalizing, using the computing system, the first consolidated alert data relative to a plurality of consolidated alert data that is stored in the first database.

Alternatively, or additionally, at block 440 in FIG. 4B (following the circular marker denoted, "A," in FIG. 4A), method 400 may comprise providing, using the computing system, a probe user interface ("UI") to the user. In some embodiments, the probe UI may include, without limitation, at least one of: (a) a search tool configured to provide the user with one or more of options to search for one or more devices among the plurality of layer 4 devices, or options to provide information regarding the one or more devices; (b) a probe management tool configured to provide the user with one or more of options to search for one or more software-based network probes and to provide information regarding the one or more software-based network probes, options to create one or more software-based network probes, options to modify a software-based network probe, options to upload a software-based network probe, options to move one or more software-based network probes, options to download one or more software-based network probes, or options to start or stop one or more software-based network probes; and to generate or update probe configuration files for one or more software-based network probes; or (c) a node tester tool configured to provide the user with one or more of options for selecting a device among the plurality of layer 4 devices to test connectivity and/or access to the layer 4 device ("network node"), or options to connect to a probe manager managing one or more software-based network probes used to monitor the selected device; and/or the like.

Alternatively, or additionally, in FIG. 4B (following the circular marker denoted, "A," in FIG. 4A), method 400 may comprise one or more of: monitoring, using at least one of the computing system or a probe manager, the first plurality of software-based network probes (block 445); in response to a determination that a software-based network probe among the first plurality of software-based network probes is unresponsive, sending, using at least one of the computing system or the probe manager, a command to the software-based network probe to restart (block 450); or in response to a new network device being added to a second network among the plurality of networks, selecting and sending, using the at least one of the computing system or the probe manager, commands to a software-based network probe to monitor the new network device (block 455); and/or the like.

Alternatively, or additionally, at block 460 in FIG. 4B (following the circular marker denoted, "A," in FIG. 4A), method 400 may comprise receiving, using the computing system and from one or more servers in the plurality of networks, a request for data associated with a second device among the plurality of layer 4 devices; and querying, using the computing system, the first database to determine whether the first database contains data including at least one of alert data, device data, or network data that are associated with the second device. If not, method 400 continues onto the process at block 470. If so, method 400 continues onto the process at block 475. At block 470, method 400 may comprise, based on a determination that the first database does not contain device data and/or network data, querying, using the computing system, the one or more second databases to determine whether the one or more second databases contain at least one of device data or network data that are associated with the second device. At block 475, method 400 may comprise sending, using the computing system and to the one or more servers, a response to the request, the response comprising data that is based at least in part on data obtained from at least one of the first database or the one or more second databases.

Referring to the non-limiting embodiment of FIG. 4C, generating the one or more software-based network probes (at block 405) may comprise at least one of: generating, using the computing system, one or more software-based network probes, based on corresponding one or more templates each for a particular type and/or model of layer 4 device among the plurality of layer 4 devices (block 405*a*); generating, using the computing system and an automated bulk probe generation and deployment system, a second plurality of software-based network probes among the first plurality of software-based network probes, based at least in part on parameters provided by a user in a probe user interface ("UI") (block 405*b*); generating, using the computing system and an add/remove node tool ("ANT"), one or more software-based network probes one at a time, based at least in part on user input via a UI of the ANT (block 405*c*); or generating, using the computing system, one or more software-based network probes, by building a configuration file for each software-based network probe, storing each configuration file in a probe database, and starting probe processes for each software-based network probe based on the corresponding configuration file (block 405*d*); and/or the like.

Exemplary System and Hardware Implementation

Figure 5:
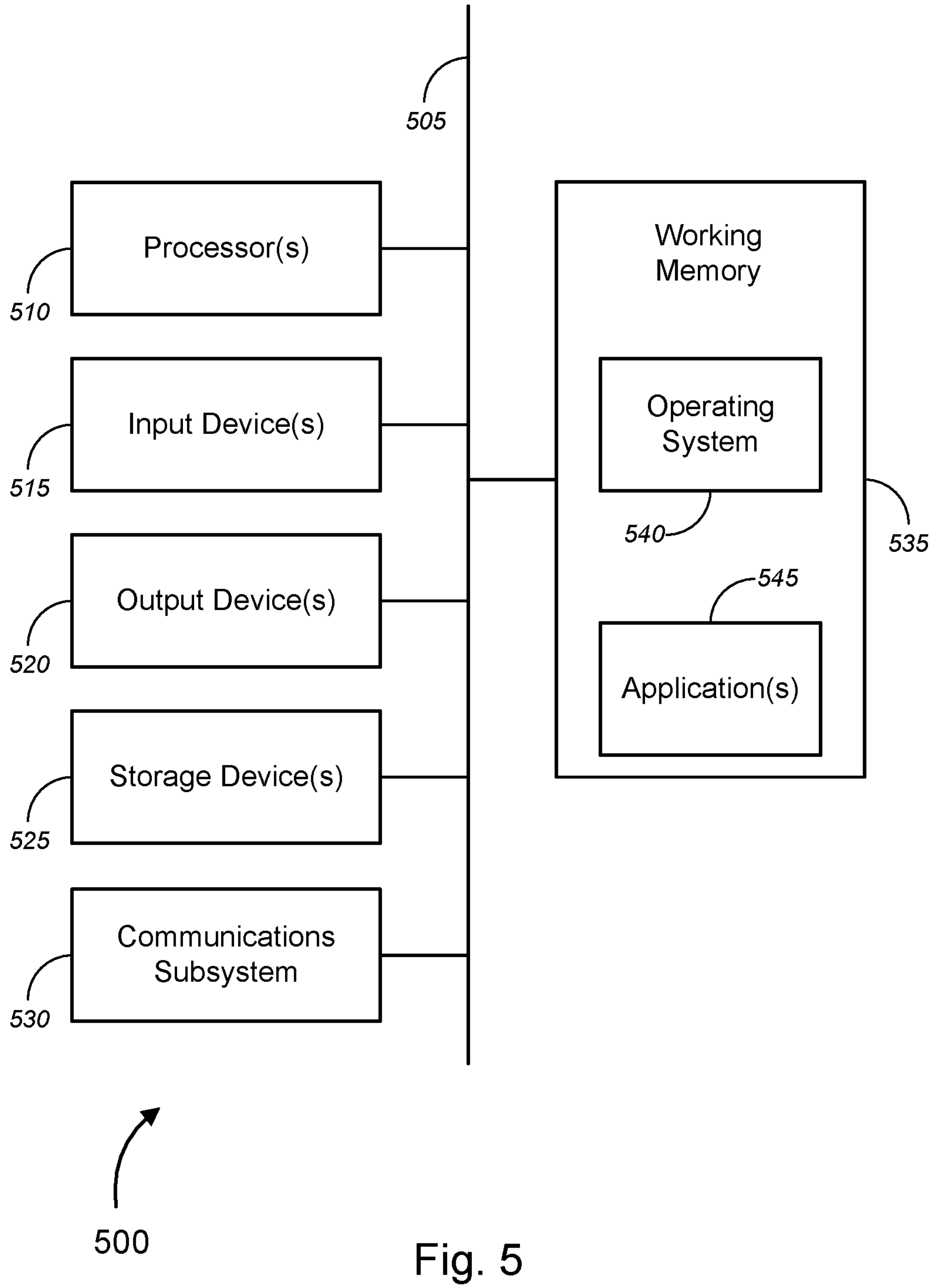
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing system 105, probe manager 115, network probes 120, passive probes 125, network management system ("NMS") server or node broker 130, probe-on-demand ("POD") system 135, network devices 150*a*-150*n*, add/remove node tool ("ANT") 155, real-time fault management system ("RFM") 165, user devices 170*a*-170*n*, requesting servers/databases ("DBs") 180*a*-180*n*, network database ("NED") 180*b*, requesting server 180*c*, and Intelligent Configuration System ("ICS") 190 and node broker 190*a*, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing system 105, probe manager 115, network probes 120, passive probes 125, NMS server or node broker 130, POD system 135, network devices 145*a*-145*n*, ANT 155, RFM 165, user devices 170*a*-170*n*, requesting servers/DBs 180*a*-180*n*, NED 180*b*, requesting server 180*c*, and ICS 190 and node broker 190*a*, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like. In some embodiments, some of these computer or hardware systems may be implemented as virtual devices or software-based systems running on hardware comprising one or more of the hardware elements shown in FIG. 5.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

receiving, using a computing system and from at least one first software-based network probe among a first plurality of software-based network probes, a first alert associated with a first device among a plurality of layer 4 devices that is each disposed within at least one first network among a plurality of networks, the layer 4 devices corresponding to open systems interconnection ("OSI") model's transport layer, the first alert comprising first alert data;

performing, using the computing system and an enrichment system, enrichment of the first alert data, by:

retrieving first enrichment data from one or more second databases, the first enrichment data comprising at least one of first device data associated with the first device or first network data associated with a network in which the first device is disposed; and adding the first enrichment data to the first alert data stored in a first database to form first consolidated alert data;

sending, using the computing system, the first consolidated alert data to a fault management system for display to a user to facilitate addressing of the first alert by the user, receiving, using the computing system and from one or more servers in the plurality of networks, a request for data associated with a second device among the plurality of layer 4 devices;

querying, using the computing system, the first database to determine whether the first database contains data including at least one of alert data, device data, or network data that are associated with the second device;

based on a determination that the first database does not contain device data and/or network data, querying, using the computing system, the one or more second databases to determine whether the one or more second databases contain at least one of device data or network data that are associated with the second device; and sending, using the computing system and to the one or more servers, a response to the request, the response comprising data that is based at least in part on data obtained from at least one of the first database or the one or more second databases.

2. The method of claim 1, wherein the computing system comprises at least one of a network management system server, a node broker system, a probe manager, the fault management system, a network operations center ("NOC") computing system, a server over a network, a cloud computing system, or a distributed computing system.

3. The method of claim 1, wherein the plurality of networks comprises two or more disparate networks utilizing different alert management protocols and different fault management protocols.

4. The method of claim 1, wherein the first database comprises at least one of a remote dictionary server ("Redis") database, a non-relational ("NoSQL") database, or a relational ("SQL") database.

5. The method of claim 1, wherein the first consolidated alert data comprises real-time or near-real-time consolidated alert data, wherein the fault management system comprises a real-time fault management system ("RFM") that displays the real-time or near-real-time consolidated alert data.

6. The method of claim 1, wherein the plurality of layer 4 devices comprises at least one of a layer 4 switch, a gateway device, a network node, a gateway node, a firewall, an optical network switch and routing platform, a wavelength division multiplexing ("WDM")-based optical transport network system, or a network transmission system.

7. The method of claim 1, wherein the first plurality of software-based network probes comprises at least one of one or more translation language protocol ("TL1")-based software-based network probes, one or more passive software-based network probes configured to passively receive alert data, one or more active software-based network probes configured to actively poll and/or ping layer 4 devices for alert data, or one or more combination software-based network probes that combine capabilities of the passive and active software-based network probes.

8. The method of claim 1, further comprising:

generating, using the computing system, one or more second software-based network probes among the first plurality of software-based network probes.

9. The method of claim 8, wherein the one or more second software-based network probes comprise the at least one first software-based network probe.

10. The method of claim 8, wherein generating the one or more second software-based network probes comprises at least one of:

generating, using the computing system, one or more third software-based network probes, based on corresponding one or more templates each for a particular type and/or model of layer 4 device among the plurality of layer 4 devices;

generating, using the computing system and an automated bulk probe generation and deployment system, a second plurality of software-based network probes among the first plurality of software-based network probes, based at least in part on parameters provided by a user in a probe user interface ("UI");

generating, using the computing system and an add/remove node tool ("ANT"), one or more fourth software-based network probes one at a time, based at least in part on user input via a UI of the ANT; or generating, using the computing system, one or more fifth software-based network probes, by building a configuration file for each software-based network probe, storing each configuration file in a probe database, and starting probe processes for each fifth software-based network probe based on the corresponding configuration file.

11. The method of claim 1, further comprising one or more of:

monitoring, using at least one of the computing system or a probe manager, the first plurality of software-based network probes;

in response to a determination that a sixth software-based network probe among the first plurality of software-based network probes is unresponsive, sending, using at least one of the computing system or the probe manager, a command to the sixth software-based network probe to restart; or in response to a new network device being added to a second network among the plurality of networks, selecting, using at least one of the computing system or the probe manager, a seventh software-based network probe among the first plurality of software-based network probes to monitor the new network device, and sending, using the at least one of the computing system or the probe manager, commands to the selected seventh software-based network probe to monitor the new network device.

12. The method of claim 1, further comprising:

normalizing, using the computing system, the first consolidated alert data relative to a plurality of consolidated alert data that is stored in the first database.

13. The method of claim 1, further comprising:

providing, using the computing system, a probe UI to the user, the probe UI comprising at least one of:

(a) a search tool configured to provide the user with one or more of options to search for one or more third devices among the plurality of layer 4 devices, or options to provide information regarding the one or more third devices;

(b) a probe management tool configured to provide the user with one or more of options to search for one or more eighth software-based network probes and to provide information regarding the one or more eighth software-based network probes, options to create one or more ninth software-based network probes, options to modify a tenth software-based network probe, options to upload an eleventh software-based network probe, options to move one or more twelfth software-based network probes, options to download one or more thirteenth software-based network probes, or options to start or stop one or more fourteenth software-based network probes; and to generate or update probe configuration files for one or more fifteenth software-based network probes; or (c) a node tester tool configured to provide the user with one or more of options for selecting a fourth device among the plurality of layer 4 devices to test connectivity and/or access to the layer 4 device ("network node"), or options to connect to a probe manager managing one or more sixteenth software-based network probes used to monitor the selected fourth device.

14. A system, comprising:

a computing system, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the computing system to:

receive, from at least one first software-based network probe among a first plurality of software-based network probes, a first alert associated with a first device among a plurality of layer 4 devices that is each disposed within at least one first network among a plurality of networks, the layer 4 devices corresponding to open systems interconnection ("OSI") model's transport layer, the first alert comprising first alert data;

perform, using an enrichment system, enrichment of the first alert data, by:

retrieving first enrichment data from one or more second databases, the first enrichment data comprising at least one of first device data associated with the first device or first network data associated with a network in which the first device is disposed; and adding the first enrichment data to the first alert data stored in a first database to form first consolidated alert data;

send the first consolidated alert data to a fault management system for display to a user to facilitate addressing of the first alert by the user;

receive, from one or more servers in the plurality of networks, a request for data associated with a second device among the plurality of layer 4 devices;

query the first database to determine whether the first database contains data including at least one of alert data, device data, or network data that are associated with the second device;

based on a determination that the first database does not contain device data and/or network data, query the one or more second databases to determine whether the one or more second databases contain at least one of device data or network data that are associated with the second device; and send, to the one or more servers, a response to the request, the response comprising data that is based at least in part on data obtained from at least one of the first database or the one or more second databases.

15. The system of claim 14, wherein the computing system comprises at least one of a network management system server, a node broker system, a probe manager, the fault management system, a network operations center ("NOC") computing system, a server over a network, a cloud computing system, or a distributed computing system.

16. The system of claim 14, wherein the plurality of layer 4 devices comprises at least one of a layer 4 switch, a gateway device, a network node, a gateway node, a firewall, an optical network switch and routing platform, a wavelength division multiplexing ("WDM")-based optical transport network system, or a network transmission system.

17. The system of claim 14, wherein the first plurality of software-based network probes comprises at least one of one or more translation language protocol ("TL1")-based software-based network probes, one or more passive software-based network probes configured to passively receive alert data, one or more active software-based network probes configured to actively poll and/or ping layer 4 devices for alert data, or one or more combination software-based network probes that combine capabilities of the passive and active software-based network probes.

* * * * *